US008909766B1

(12) United States Patent
Hegg et al.

(10) Patent No.: US 8,909,766 B1
(45) Date of Patent: Dec. 9, 2014

(54) TECHNIQUES FOR PROVIDING INFORMATION ABOUT NETWORK CONNECTION STATUS

(75) Inventors: Joel C. Hegg, Seattle, WA (US); Michael B. Furr, Washington, DC (US); Aparna Nagargadde, Herndon, VA (US); Kevin Christopher Miller, Herndon, VA (US); Bashuman Deb, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 446 days.

(21) Appl. No.: 13/252,631

(22) Filed: Oct. 4, 2011

(51) Int. Cl.
*H04L 12/24* (2006.01)
(52) U.S. Cl.
CPC .............. *H04L 41/08* (2013.01); *H04L 41/085* (2013.01)
USPC ........................................................ 709/224
(58) Field of Classification Search
CPC . H04L 63/0272; H04L 63/0218; H04L 41/08; H04L 41/085; G06F 2201/815
USPC ........................................................ 709/224
See application file for complete search history.

(56) References Cited

U.S. PATENT DOCUMENTS 7,234,063 B1 * 6/2007 Baugher et al. ............... 713/189
7,596,806 B2 * 9/2009 Chen .............................. 726/11

OTHER PUBLICATIONS

Amazon Web Services, Amazon Virtual Private Cloud, Network Administrator Guide, API Version Jul. 15, 2011.

* cited by examiner

*Primary Examiner* — Kristie Shingles
(74) *Attorney, Agent, or Firm* — Kilpatrick Townsend & Stockton LLP

(57) ABSTRACT

Systems and methods involve receiving a connectivity subscription request for one or more connections, such as a virtual private network (VPN) connection. A connectivity subscription request may be received through an application programming interface (API) call and the connectivity subscription request may indicate that a user associated with a connection wants to receive a notification when a connectivity event occurs. A connectivity event can occur when changes to the connection are detected, such as when the connection becomes active, when the connection becomes inactive, or when one or more tunnel connections related to the connection becomes disconnected. A potential problem associated with the connectivity event may be detected and a potential solution to the problem may be determined. The potential solution can be sent to a user associated with the connectivity event.

30 Claims, 11 Drawing Sheets

TECHNIQUES FOR PROVIDING INFORMATION ABOUT NETWORK CONNECTION STATUS

BACKGROUND

Computers, such as servers, are often configured to communicate over connections to other computers. Performance of one or more systems of an organization can suffer if the connection becomes disconnected. For example, a server may communicate with a desktop computer through a virtual private network (VPN) connection over the Internet. If the connection between the server and the desktop computer cannot be established or if the connection becomes disconnected, a user may experience problems, but may not have any indication of the source of the problem. For example, a user may be unable to access important data stored on a server if a connection cannot be established between the user's computer and the server. Furthermore, the user may not have any indication of the source of the problem or an indication of a potential solution to correct the connection failure.

Computers exchange information in various ways and for various purposes. In many instances, the ways in which computers communicate are a result of requirements in terms of performance, security, or other requirements. For example, an organization may configure one network to communicate with another, remote network over a virtual private network (VPN) connection. A VPN connection is one way of efficiently and securely exchanging information between at least two networks. A VPN connection may be related to other connections or associations. For example, a VPN connection may have two tunnel connections and each tunnel connection may be associated with an internet key exchange (IKE) security association, internet protocol security association (IPsec), and a border gateway protocol (BGP) status. If a connection cannot be established between two networks or if the connection becomes disconnected, a user may not have any indication as to which portion of the connection is the source of the problem. For example, a user may not have an indication as to whether the connection problem is related to a particular tunnel, IKE, or IPsec associated with the connection.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
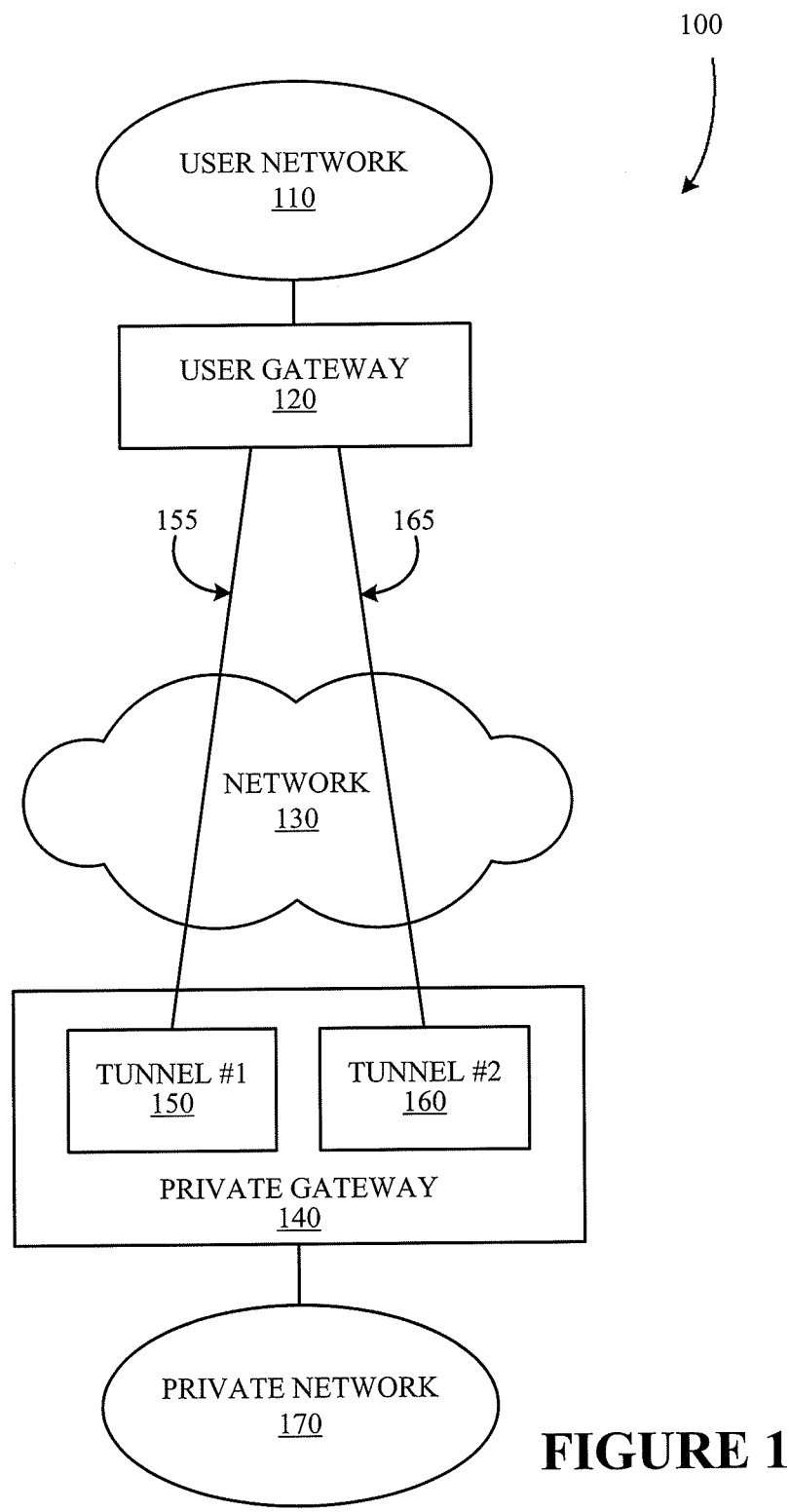
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for receiving and managing connectivity subscription requests for one or more connections. In a particular illustrative embodiment, a request is received from a user. The request may indicate that the user wants to subscribe to notifications of connectivity events related to one or more connections. In other embodiments, notifications may be made without any specific requests to receive notifications having been made, such as a service provided to those utilizing the one or more connections. A connection can be made up of one or more different types of connections. A virtual private network (VPN) connection is one possible type of connection that may comprise one or more other connections. For example, a VPN connection may contain a first tunnel connection and a second tunnel connection. Each tunnel connection, in turn, may use or otherwise be associated with an internet key exchange (IKE) association, internet protocol security (IPsec) association, and a BGP connection. Thus, in an embodiment, a single connection may comprise one or more other types of connections.

Information related to one or more connections may be obtained by various devices related to the connections. For example, traffic being sent or received over one or more connections may be monitored by a server to obtain information related to the connections. A server may request information from one or more devices related to a connection. For example, a server may request information from a gateway regarding a status of a connection. In an embodiment, other devices such as a router or a gateway may monitor traffic related to one or more connections. A router may keep a data log for traffic sent over one or more connections. A router or gateway may proactively perform diagnostic tests such as pinging a device associated with a connection to obtain information about the connection.

Information obtained from the various devices is analyzed to determine whether a connectivity event related to one or more connections has occurred. This analysis may be performed by any number of devices. For example, the server may perform the analysis. In an embodiment, a gateway or a router may analyze information to determine whether a connectivity event has occurred. In analyzing the information obtained, a data store may be queried by one or more devices. For example, the data store may contain information related to the request such as the type or types of connectivity events a user wants to be notified of for one or more connections.

A connectivity event may include a set of one or more occurrences related to one or more connections. In an embodiment, a connectivity event occurs when a connection becomes established. A connectivity event can occur when a connection becomes disconnected. In an embodiment, a connectivity event may be related to a portion of a connection. For example, a connectivity event may occur when every tunnel in a connection becomes unavailable. A connectivity event may occur when one or more tunnels in a multi-tunnel connection becomes unavailable. A connectivity event can occur when a set of one or more conditions is fulfilled. For example, a user may be associated with three connections. In this embodiment, a connectivity event may occur when all three connections become unavailable. In another embodiment, a connectivity event can occur when one or more of the three connections becomes disconnected.

When a connectivity event occurs that is related to a subscription request, a notification of the connectivity event may be sent to one or more users associated with the subscription request. The notification can be provided in any number of ways. For example, a notification may be provided to one or more users via an email. In an embodiment, a notification text message may be sent to one or more numbers associated with the connectivity event or the subscription request, or both. In one embodiment, a notification may be provided on a graphical user interface on a web page. For example, a user may be able to log into an account associated with one or more subscription requests and view a status of the connections or a notification.

When a connectivity event occurs, a potential cause of the connectivity event may be determined. Various aspects of a connection may be analyzed to determine a potential problem. Information collected for determining whether a connectivity event has occurred may be analyzed to determine a potential cause. Information may be collected from various devices, such as one or more servers or gateways, that is analyzed by one or more devices to determine a potential cause. For example, a determination may be made as to whether BGP is correctly configured for the connection. In an embodiment, diagnostics may be performed to determine whether a firewall associated with the connection is properly configured. One or more queries may be sent to determine if an IPsec security association exists for a connection. Tests may also be conducted to determine whether an IKE security association exists. Based in part on at least one of these tests, in one embodiment, a potential cause is determined.

Once a potential cause has been determined, a potential solution to the cause may be determined. For example, if no IKE security association exists, then one potential solution may be to verify the IKE configuration settings to make sure that the encryption, authentication, and mode parameters are correctly configured. If an IPsec security association does not exist, then one potential solution may be to verify that the IPsec security association configuration is properly configured. If there is no IP connectivity via a tunnel in a connection, then a potential solution may be to verify that the tunnel interface configuration is properly configured. If a BGP status associated with a connection is not active, then the BGP configuration may need to be verified.

In an embodiment, a potential solution may be determined by any number of devices. Information collected for determining whether a connectivity event has occurred may be analyzed to determine a potential solution. Information collected for determining whether a potential problem related to a connection may be analyzed to determine a potential solution. Additional information may be collected from various devices, such as one or more servers or gateways, that is analyzed by one or more devices. For example, a server related to the connection may determine a potential solution to a potential problem related to a connectivity event. A gateway or a router related to the connection may determine a potential solution to a potential problem. In one embodiment, a data store contains information regarding potential problems and potential solutions. Thus, the various embodiments may access the data store in determining a potential problem or a potential solution, or both.

Once a potential solution to a potential cause has been determined, a notification can be sent to a user associated with the connectivity event. The notification may be in any form of communication including, but not limited to, a text message, an email, or an automated phone call. In an embodiment, the notification with the potential solution may be sent together with the connectivity event notification. In another embodiment, notification with the potential solution may be sent separately from the notification with the connectivity event.

FIG. 1 illustrates a system diagram depicting exemplary devices in an exemplary computing environment according to various embodiments. The system 100 shown in FIG. 1 includes a user network 110, a user gateway 120, a private gateway 140, and a private network 170. In this embodiment, the user gateway 120 is connected with the user network 110 and the private gateway 140 is connected with the private network 170. The user gateway 120 and the private gateway 140 can communicate with each other through the network 130. The connection between the user gateway 120 and the private gateway 140 may be a VPN connection. In the embodiment shown in FIG. 1, the VPN connection has two tunnel connections 155, 165. The first tunnel connection 155 connects the user gateway 120 with the private gateway 140 through tunnel 150. The second tunnel connection 165 connects the user gateway 120 with the private gateway 140 through the tunnel 160. Each tunnel connection 155, 165 can independently be used to communicate with the user gateway 120 and the private gateway 140. If tunnel connection 155 fails, the user gateway 120 may still be able to communicate with the private gateway 140, and vice versa, through tunnel connection 165. Thus, the user network 110 can communicate with the private network 170 through the user gateway 120, network 130, and the private gateway 140.

In embodiments, the user network 110 shown in FIG. 1 facilitates communications between various devices connected with the user network 110 and the private network 170. The user network 110 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the user network 110 may be a single network. In other embodiments, the user network 110 may comprise two or more networks.

In embodiments, the user gateway 120 can include any device or devices that is capable of facilitating communications between two or more networks or devices. For example, in FIG. 1, the user gateway 120 may be able to facilitate communications between the user network 110 and the private network 170 through the network 130 and the private gateway 140. In one embodiment, one or more routers may be used to facilitate communications between the two or more networks or devices. In another embodiment, the user gateway 120 may be an application capable of facilitating communications between two or more networks or devices. For example, in FIG. 1, the user gateway 120 may be an application executing on a server that facilitates communications between the user network 110 and the private network 170 through the network 130 and the private gateway 140.

In embodiments, the network 130 shown in FIG. 1 facilitates communications between the user network 110 and the private network 170. The network 130 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the network 130 may be a single network. In other embodiments, the network 130 may comprise two or more networks. In an embodiment, the network 130 may be a network that is managed by one or more entities. For example, the network 130 may be managed by a computing resource provider such as a cloud computing provider.

In embodiments, the private gateway 140 can include any device or set of devices capable of facilitating communications between two or more networks or devices. For example, in FIG. 1, the private gateway 140 may be able to facilitate communications between the user network 110 and the private network 170 through the network 130 and the user gateway 120. In one embodiment, one or more routers may be used to facilitate communications between the two or more networks or devices. In another embodiment, the private gateway 140 may be an application capable of facilitating communications between two or more networks or devices. For example, in FIG. 1, the private gateway 140 may be an application executing on one or more servers that facilitates communications between the user network 110 and the private network 170 through the network 130 and the user gateway 120.

The private gateway 140 or the user gateway 120, or both, may support multiple tunnels for a single connection. For example, in FIG. 1, a VPN connection may comprise a first tunnel connection 155 and a second tunnel connection 165. Each tunnel connection 155, 165 may be able to independently facilitate communications between the user gateway 120 and the private gateway 140 through the network 130. Redundant tunnel connections in single connection may be useful for providing communications between networks or devices when one or more tunnels become unavailable. For example, in FIG. 1, if tunnel connection 155 fails, then the user gateway 120 may still be able to communicate with the private network 170 through the second tunnel 160 in the private gateway 140 and through the network 130.

In embodiments, the private network 170 shown in FIG. 1 facilitates communications between various devices connected with the private network 170 and the user network 110. The private network 170 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the private network 170 may be a single network. In other embodiments, the private network 170 may comprise two or more networks. In an embodiment, the private network 170 may be a network that is managed by one or more entities. For example, the private network 170 may be managed by a computing resource provider such as a cloud computing provider.

Figure 2:
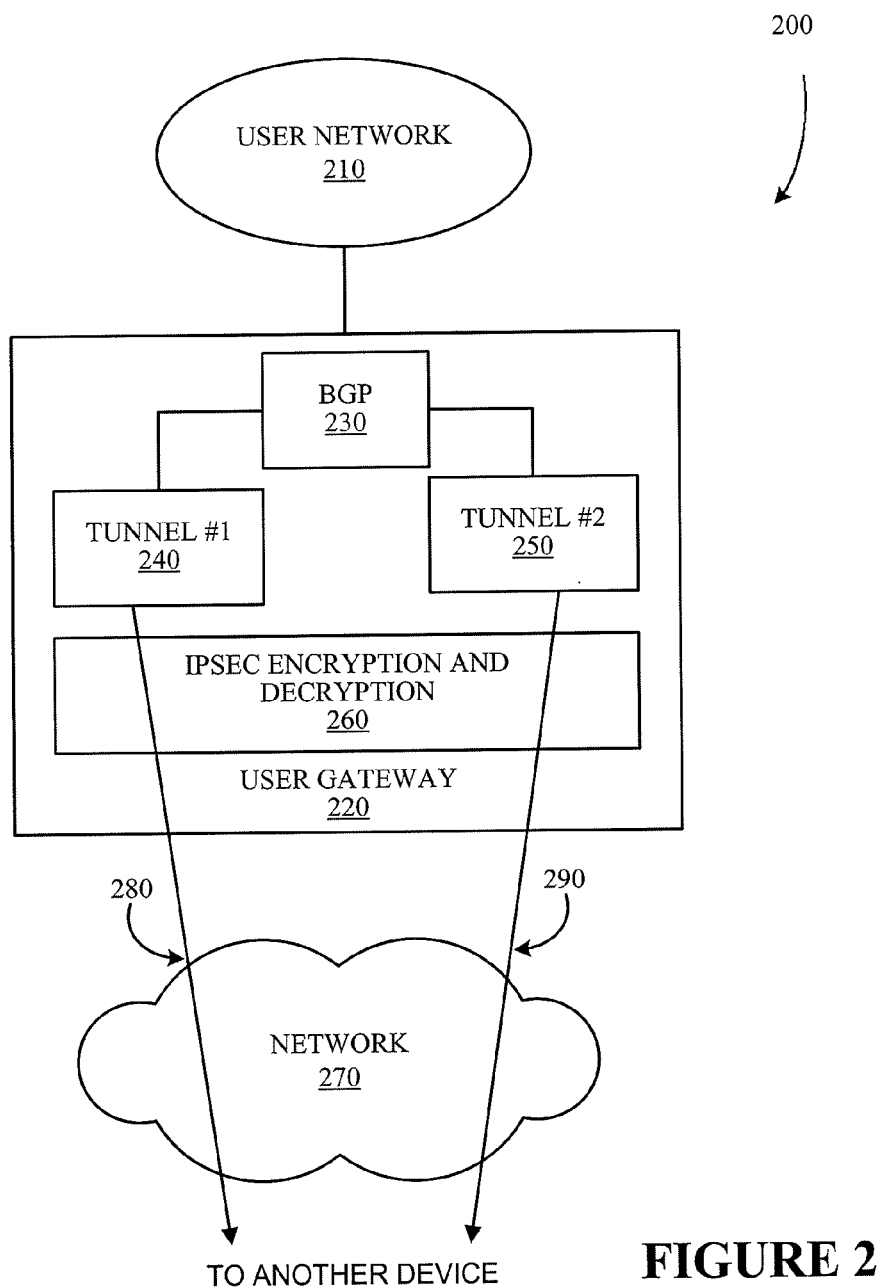
FIG. 2 illustrates an environment in which various embodiments can be implemented.

FIG. 2 illustrates an environment 200 in which various embodiments can be implemented. The environment 200 shown in FIG. 2 includes a user network 210, a user gateway 220, and a network 270. In an embodiment, the user gateway 220 is in communication with the user network 210 and the network 270. The user gateway 220 enables a device in the user network 210 to communicate with another device in communication with the network 270. For example, the user gateway 220 may enable a desktop computer in the user network 210 to communicate with a server in a private network through the network 270 by using tunnel connection 280, tunnel connection 290, or both. In the embodiment shown in FIG. 2, the user gateway 220 comprises a border gateway protocol (BGP) 230, a first tunnel 240, a second tunnel 250, and internet protocol security (IPsec) 260.

In embodiments, the user network 210 shown in FIG. 2 facilitates communications between various devices connected with the user network 210 and the network 270. The user network 210 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the user network 210 may be a single network. In other embodiments, the user network 210 may comprise two or more networks.

In embodiments, the user gateway 220 can include any device or devices that is capable of facilitating communications between two or more networks. For example, in FIG. 2, the user gateway 220 may be able to facilitate communications between the user network 210 and the network. In one embodiment, one or more routers may be used to facilitate communications between the two or more networks. In another embodiment, the user gateway 220 may be an application capable of facilitating communications between two or more networks. For example, in FIG. 2, the user gateway 220 may be an application executing on a server that facilitates communications between the user network 210 and network 270.

In embodiments, the user gateway 220 can include any device or devices that is capable of facilitating communications between two or more networks or devices. For example, in FIG. 2, the user gateway 220 may be able to facilitate communications between the user network 210 and the network 270. In another embodiment, the user gateway 220 may be able to facilitate communications between the user network 210 and another device through tunnel connection 280 or tunnel connection 290, or both. In one embodiment, one or more routers may be used to facilitate communications between the two or more networks or devices. In another embodiment, the user gateway 220 may be an application capable of facilitating communications between two or more networks or devices. For example, in FIG. 2, the user gateway 220 may be an application executing on a server that facilitates communications between the user network 210 and the network 270. In another embodiment, the user gateway 220 may be able to facilitate communications between the user network 210 and another device through tunnel connection 280 or tunnel connection 290, or both.

The user gateway 220 may support multiple tunnels for a single connection. For example, in FIG. 2, a VPN connection may comprise a first tunnel connection 280 and a second tunnel connection 290. Each tunnel connection 280, 290 may be able to facilitate communications between the user network 210 and the network 270 or another device. Thus, if tunnel connection 280 becomes unavailable, then the user gateway 220 may still be able to communicate with the network 270 or another device through the second tunnel connection 290.

The user gateway 220 may support any number of protocols, associations, or other connections. In FIG. 2, the user gateway 200 supports IPsec encryption and decryption 260 and border gateway protocol (BGP) 230. For example, IPsec encryption and decryption 260 may be used to authenticate, encrypt, and decrypt packets sent to and from the first tunnel 240 through the first tunnel connection 280. IPsec encryption and decryption 260 may also be used to authenticate, encrypt, and decrypt packets sent to and from the second tunnel 250 through the second tunnel connection 290. BGP 230 may be used by the user gateway 220 to exchange route information between itself and another device, such as another gateway or router.

In embodiments, the network 270 shown in FIG. 2 facilitates communications between the user network 210 and other devices connected with the network 270. The network 270 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the network 270 may be a single network. In other embodiments, the network 270 may comprise two or more networks.

Figure 3:
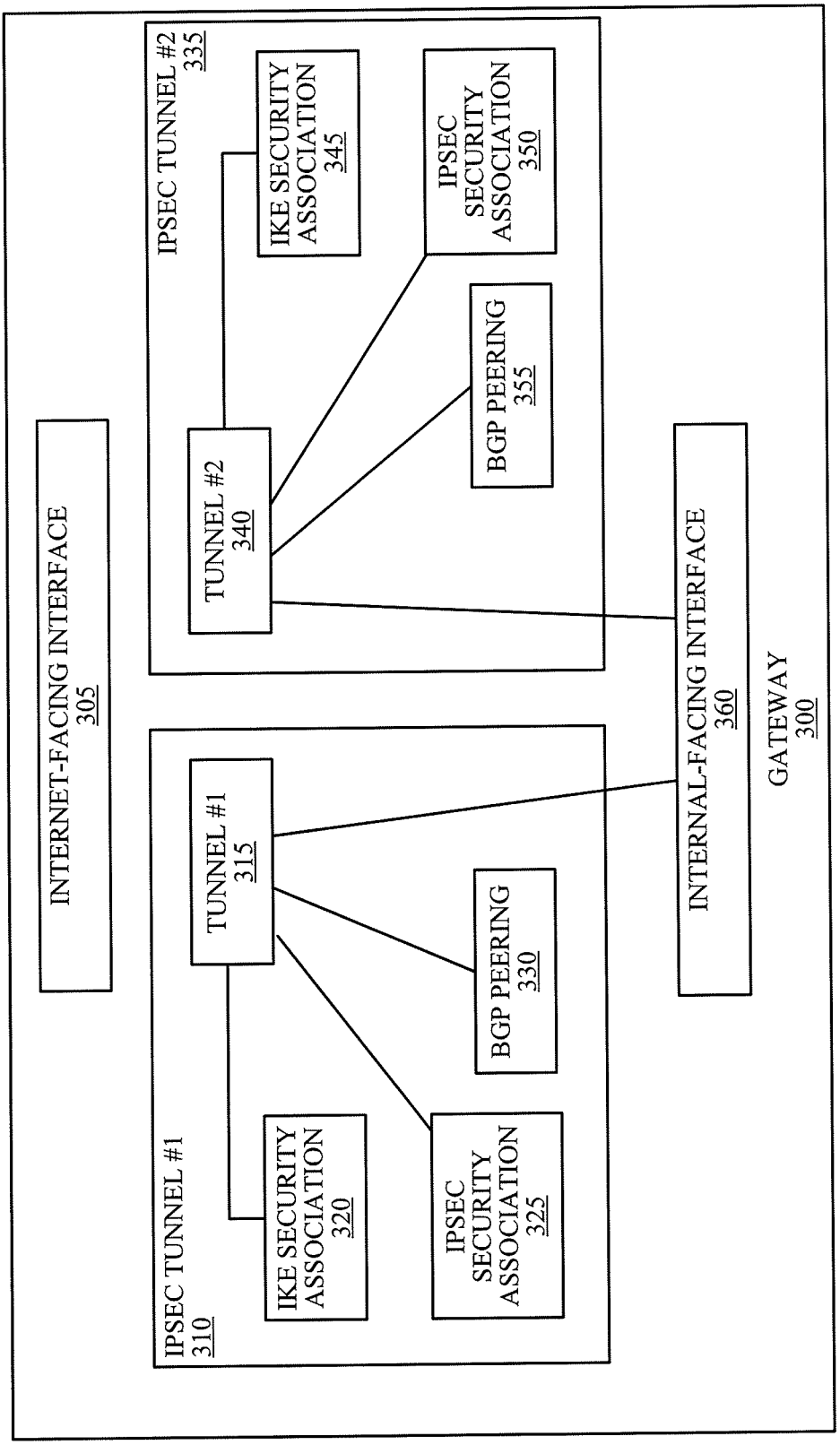
FIG. 3 illustrates an exemplary gateway according to an embodiment.

FIG. 3 illustrates an exemplary gateway 300 according to an embodiment. In the embodiment shown in FIG. 3, the gateway 300 has an internet-facing interface 305, two IPsec tunnels 310, 335, and an internal-facing interface 360. The first IPsec tunnel 310 has a first tunnel 315 that is associated with a first internet key exchange (IKE) security association 320, a first IPsec security association 325, and a first BGP peering 330. The second IPsec tunnel 335 has a second tunnel 340 that is associated with a second internet key exchange (IKE) security association 345, a second IPsec security association 350, and a second BGP peering 355.

The gateway 300 as shown in FIG. 3 comprises an internet-facing interface 305 for communicating via wired or wireless communication. For example, the internet-facing interface 305 may allow for communication over networks via Ethernet, IEEE 802.11 (Wi-Fi). 802.16 (Wi-Max), Bluetooth, infrared, etc. As another example, the internet-facing interface 305 may allow for communication over networks such as CDMA, GSM, UMTS, or other cellular communication networks.

The gateway 300 may support any number of protocols, associations, or other connections. In FIG. 3, the gateway 300 supports at least a first IPsec tunnel 310 and a second IPsec tunnel 335. The first IPsec tunnel 310 shown in FIG. 3 comprises a first tunnel 315. The first tunnel 315 can facilitate communications between at least two networks or devices associated with the gateway 300. The first IPsec tunnel 310 supports an IKE security association 320 which may be required to exchange keys used to establish another connection, such as an IPsec security association. The first IPsec tunnel 310 also supports an IPsec security association 325 which can handle the authentication, encryption, and decryption of packets sent or received by the first tunnel 315. In addition, the first IPsec tunnel 310 shown in FIG. 3 supports BGP peering 330 that may be used to exchange route information between devices associated with the connection. For example, referring back to FIG. 1, if the user gateway 120 supports BGP peering, then route information may be exchanged between the user gateway 120 and the private gateway 140. The first tunnel 315 can send and receive traffic going to and from the IPsec tunnel 310.

In FIG. 3, the gateway 300 supports a second IPsec tunnel 335. The second IPsec tunnel 335 shown in FIG. 3 comprises a second tunnel 340. The second tunnel 340 can facilitate communications between at least two networks or devices associated with the gateway 300. The second IPsec tunnel 335 supports an IKE security association 345 which may be required to exchange keys used to establish another connection, such as an IPsec security association. The second IPsec tunnel 335 also supports an IPsec security association 350 which can handle the authentication, encryption, and decryption of packets sent or received by the second tunnel 340. In addition, the second IPsec tunnel 335 shown in FIG. 3 supports BGP peering 355 that may be used to exchange route information between devices associated with the connection. For example, referring back to FIG. 1, if the user gateway 120 supports BGP peering, then route information may be exchanged between the user gateway 120 and the private gateway 140. The second tunnel 340 can send and receive traffic going to and from the IPsec tunnel 335.

In embodiments, the settings associated with the first IPsec tunnel 310 may be different than the settings associated with the second IPsec tunnel 335. For example, a first key related to IKE security association 320 may be distinct from a second key related to IKE security association 345. In an embodiment, an internet protocol (IP) address related to the first BGP peering connection 330 may be different from an IP address related to the second BGP peering connection 355. Likewise, an IP address associated with the first tunnel 315 may be different than an IP address associated with the second tunnel 340, BGP peering connection 330, and BGP peering connection 355. In some embodiments, at least some information between the first IPsec tunnel 310 and the second IPsec tunnel 335 may be common. For example, in one embodiment, an autonomous system number (ASN) associated with BGP peering connection 330 may be the same as an ASN associated with BGP peering connection 335.

The gateway 300 as shown in FIG. 3 comprises an internal-facing interface 360 for communicating via wired or wireless communication. For example, the internet-facing interface 305 may allow for communication over networks via Ethernet, IEEE 802.11 (Wi-Fi), 802.16 (Wi-Max), Bluetooth, infrared, etc. As another example, the internal-facing interface 360 may allow for communication over networks such as CDMA, GSM, UMTS, or other cellular communication networks. The gateway 300 may comprise additional network interfaces for communication over one or more networks or for redundancy.

Figure 4:
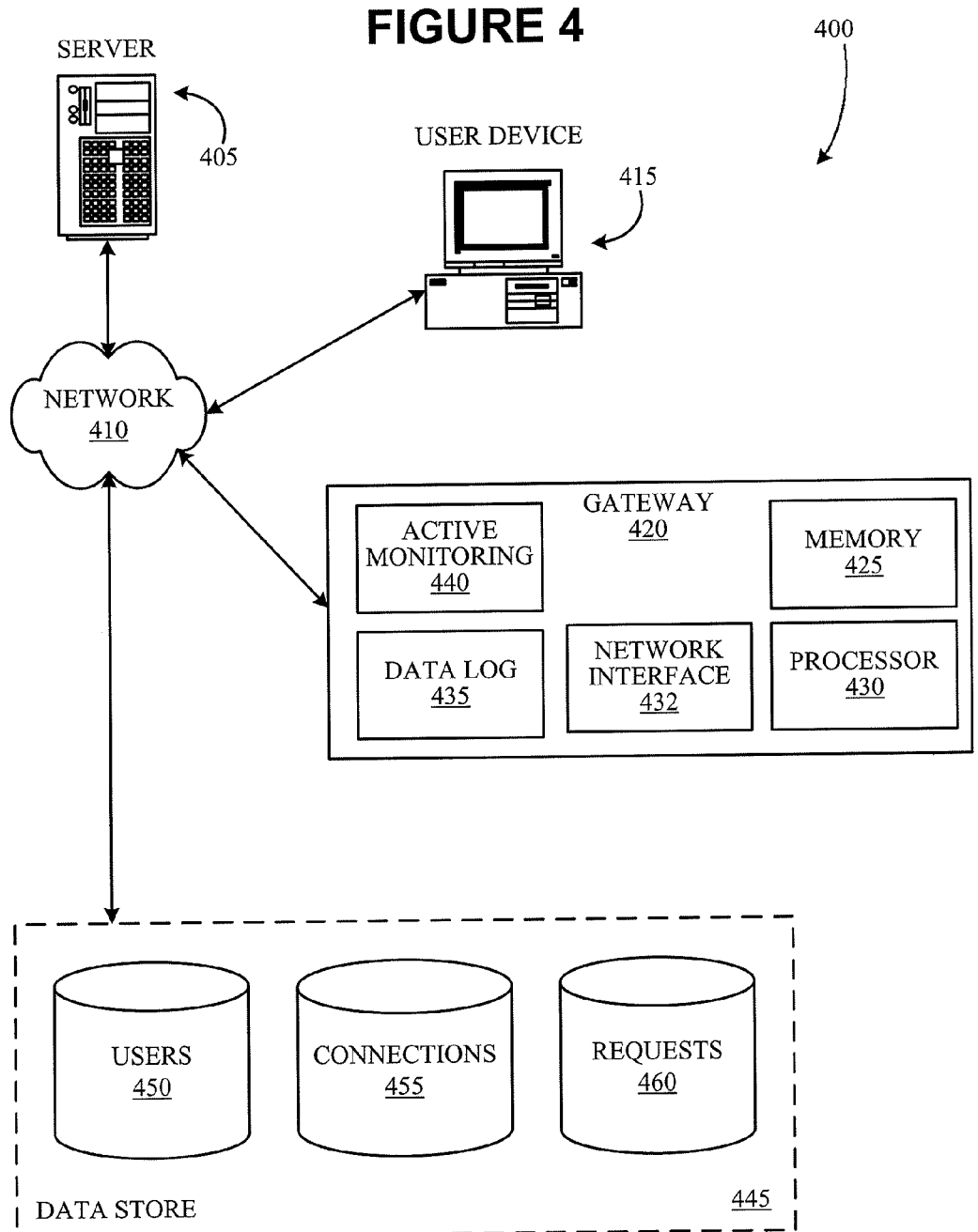
FIG. 4 illustrates an environment in which various embodiments can be implemented.

FIG. 4 illustrates aspects of an example environment 400 for implementing various embodiments of the present disclosure. The environment 400 shown in FIG. 4 comprises a server 405, a network 410, a user device 415, a gateway 420 and a data store 445. In this embodiment, the server 405, the user device 415, the gateway 420 and the data store 445 are in communication with the network 410. The server 405 can communicate with the user device 415, the gateway 420, and/or the data store 445 through the network 410. The user device 415 can communicate with the server 405, the gateway 420, and/or the data store 445 through the network. The gateway 420 can communicate with the server 405, the user device 415, and/or the data store 445 through the network 410. The gateway 420 comprises a memory 425, processor 430, a network interface 432, a data log 435, and active monitoring capabilities 440. The data store 445 can store or access information. In FIG. 4, the data store 445 comprises a user database 450, a connections database 455, and a requests database 460.

In embodiments, the server 405 shown in FIG. 4 may be any device capable of communicating with a network, such as network 410, and capable of sending and receiving information to and from another device. For example, in the embodiment shown in FIG. 4, the server 405 may receive a request from the user device 415 through the network 410. In this embodiment, the server 405 can respond to the request by sending information to the user device 415 through the network 410. In an embodiment, the server 405 can communicate with the gateway 420. The server 405 may be in communication with the data store 445. In embodiments, the server 405 may be in communication with one or more additional devices, such as additional servers. In some embodiments, the server 405 may communicate with one or more additional devices to process a request received from another device. For example, the server 405 in FIG. 4 may be in communication with a plurality of additional servers, at least one of which may be used to process at least a portion of a request from the user device 415.

In embodiments, the network 410 shown in FIG. 4 facilitates communications between the server 405, the user device 415, the gateway 420, and/or the data store 445. The network 410 may be any suitable number or type of networks or links, including, but not limited to, a dial-in network, a local area network (LAN), wide area network (WAN), public switched telephone network (PSTN), the Internet, an intranet or any combination of wired and/or wireless communication links. In an embodiment, the network 410 may be a single network. In other embodiments, the network 410 may comprise two or more networks.

In embodiments, a user device 415 may be any device capable of communicating with a network, such as network 410, and capable of sending and receiving information to and from another device. For example, in FIG. 4, the user device 415 is a desktop computer. In other embodiments, the user device 415 may be a tablet computer, a mobile phone, or a laptop. The user device 415 may be in communication with a display and be able to connect to the network 410 through a wired network connection. The user device 415 may be in communication with any number of input devices such as a keyboard or a mouse.

In an embodiment, gateway 420 can include any device or devices that is capable of facilitating communications between two or more networks or devices. For example, in FIG. 4, the gateway 420 may facilitate communications between the user device 415 through network 410 and another network (not shown) that is connected with the gateway 420. In one embodiment, one or more routers may be used to facilitate communications between the two or more networks or devices. In another embodiment, the gateway 420 may be an application capable of facilitating communications between two or more networks or devices. For example, in FIG. 4, the gateway 420 may be an application executing on one or more servers that facilitates communications between the user device 415 through network 410 and another network (not shown) that is connected with the gateway 420.

As shown in FIG. 4, the gateway 420 comprises a computer-readable medium such as a random access memory (RAM) 425 coupled to a processor 430 that executes computer-executable program instructions and/or accesses information stored in memory 425. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. In one embodiment, the gateway 420 may comprise a single type of computer-readable medium such as random access memory (RAM). In other embodiments, the gateway 420 may comprise two or more types of computer-readable medium such as random access memory (RAM) and a disk drive. The gateway 420 may be in communication with one or more external computer-readable mediums such as an external hard disk drive or an external DVD drive.

The gateway 420 shown in FIG. 4, comprises a processor 430 which executes computer-executable program instructions and/or accesses information stored in memory 425. The instructions may comprise processor-specific instructions generated by a compiler and/or an interpreter from code written in any suitable computer-programming language including, for example, C, C++, C#, Visual Basic, Java®, Python, Perl, JavaScript, and ActionScript®. In an embodiment, the gateway 420 comprises a single processor 430. In other embodiments, the gateway 420 comprises two or more processors.

The gateway 420 shown in FIG. 4 comprises a network interface 432 for communicating via wired or wireless communication. For example, the network interface 432 may allow for communication over networks via Ethernet, IEEE 802.11 (Wi-Fi), 802.16 (Wi-Max), Bluetooth, infrared, etc. As another example, the network interface 432 may allow for communication over networks such as CDMA, GSM, UMTS, or other cellular communication networks. The gateway 420 may comprise additional network interfaces for communication over one or more networks or for redundancy.

The gateway 420 shown in FIG. 4 comprises a data log 435. A data log 435 can contain information regarding one or more connections associated with the gateway 420. For example, a data log 435 may contain information including, but not limited to, internet protocol (IP) addresses, media access control (MAC) addresses, whether a connection was successful, the number of tunnels in a connection, a type of encryption, a strength of encryption, connection length, connection speed, bandwidth available, bandwidth used, number of connections, type of connections, traffic direction, port numbers, host names, dates, times, packets received, or a combination thereof. In embodiments, the gateway 420 may contain two or more data logs. For example, a separate data log may be created each day.

The gateway 420 shown in FIG. 4 comprises active monitoring capabilities 440. In embodiments, active monitoring 440 may be accomplished by computer-executable program instructions stored in memory 425. The instructions may comprise processor-specific instructions generated by a compiler and/or an interpreter from code written in any suitable computer-programming language including, for example, C, C++, C#, Visual Basic, Java®, Python, Perl, JavaScript, and ActionScript®. In other embodiments, active monitoring 440 may be accomplished by specified hardware in the gateway 420. In embodiments, a combination of hardware or software, or both, may be used to perform active monitoring.

Active monitoring 440 can include any number of actions that can be performed by the gateway 420. For example, the gateway 420 may send one or more packets to a destination device. In this example, the gateway 420 may collect and/or store information related to whether any communication is received in response to the sent packets. For example, the gateway 420 may not receive a response and the gateway 420 can collect and/or store information related to the status of a connection based on not receiving a response. If a response is received, the gateway 420 may collect and/or store information including, but not limited to, internet protocol (IP) addresses, media access control (MAC) addresses, whether a connection was successful, the number of tunnels in a connection, a type of encryption, a strength of encryption, connection length, connection speed, bandwidth available, bandwidth used, number of connections, type of connections, traffic direction, port numbers, host names, dates, times, packets received, response time, route information, or a combination thereof. Active monitoring 440 can include performing a ping, traceroute, or other diagnostic procedures.

The environment 400 shown in FIG. 4, includes a data store 445. The data store 445 can include several separate data tables, databases, or other data storage mechanisms and media for storing data relating to a particular aspect. For example, the data store 445 illustrated includes mechanisms for storing user information 450, connection information 455, and request information 460. It should be understood that there can be many other aspects that may need to be stored in the data store 445, such as for page image information and to access right information, which can be stored in any of the above listed mechanisms as appropriate or in additional mechanisms in the data store 445.

The data store 445 is operable, through logic associated therewith, to receive instructions from the server 405, user device 415, gateway 420, or a combination thereof, and obtain, update, or otherwise process data in response thereto. In one example, a user might submit a connectivity subscription request. In this case, the data store 445 might access user information to verify the identity of the user and, if the user is authorized, store information related to the connectivity subscription request. Information may be returned to the user, such as whether the user was authorized or whether the connectivity subscription request was successful. The information may be returned to the user on a Web page that the user is able to view via a browser on the user device 415. Information for a particular connection related to the connectivity subscription request can be viewed in a dedicated page or window of the browser.

In some embodiments, the server 405 may poll the gateway 420 for information related to one or more connections. In response, the gateway 420 may provide information to the server 405 or the data store 445, or both. In other embodiments, the gateway 420 may include one or more applications that monitor the status or data related to the status of one or more connections. The gateway 420 may access or store information in the data store 445. For example, in one embodiment, information collected or stored in a data log may be stored in the data store 445.

Figure 5:
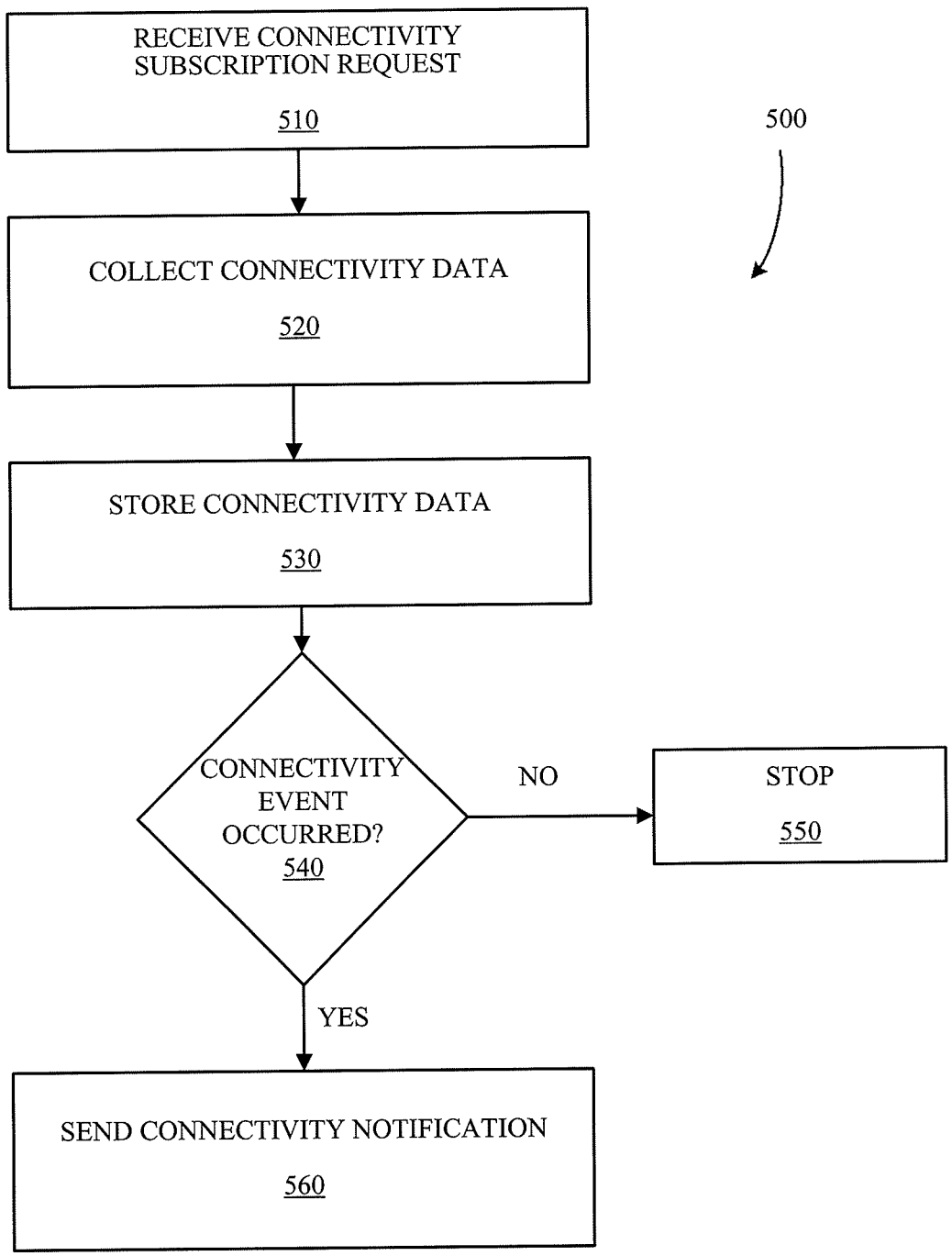
FIG. 5 is a flowchart illustrating a method of subscribing to and receiving connectivity notifications according to an embodiment.

FIG. 5 illustrates a method 500 of subscribing to and receiving connectivity notifications according to an embodiment. The description of the method 500 shown in FIG. 5 will be made with respect to FIG. 4, which illustrates an example environment 400 for implementing aspects in accordance with various embodiments. It should be noted, however, that the scope of the present disclosure is not limited to the explicit environment illustrated in FIG. 4, but in other environments, including variations of FIG. 4 not explicitly illustrated or described. Some or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The method 500 shown in FIG. 5, begins when a connectivity subscription request is received 510. For example, referring to FIG. 4, the user device 415 may send a connectivity subscription request to the server 405.

In embodiments, a connectivity subscription request may include identification information. For example, a connectivity subscription request can include authentication information, such as a username and a password. In this embodiment, if the server 405 receives a connectivity subscription request from the user device 415, the server 405 may verify the username and password in the request with information contained in the data store 445. In another embodiment, a connectivity subscription request may include a key or other unique identification that can be used to verify the user submitting the connectivity subscription request and verify that the user has sufficient privileges to access information requested by the request.

A connectivity subscription request may include information related to a connectivity event for one or more connections. For example, a connectivity subscription request can include a request to receive a notification when a connectivity event occurs. A connectivity event can occur upon the fulfillment of one or more conditions related to one or more connections. In one embodiment, a connectivity event occurs when one or more connections become active. For example, a connectivity event may occur when one connection becomes established. In other embodiments, a connectivity event occurs when two or more connections each become available. In an embodiment, a connectivity event occurs when one or more connections become disconnected. For example, a connectivity event may occur when a single connection becomes disconnected. A connectivity event can occur when two or more connections each become unavailable.

In embodiments, a connectivity event can occur when a portion of a connection becomes available or unavailable. A connection may be redundant. For example, a VPN connection may contain a first tunnel connection and a second tunnel connection such that if the first connection become unavailable, the VPN connection may still send and receive communications through the second tunnel connection. In this embodiment, a connectivity event occurs when the first tunnel connection or the second tunnel connection becomes available. In another embodiment, a connectivity event occurs when the first tunnel connection or the second tunnel connection becomes unavailable. One connectivity event occurs when the first tunnel connection and the second tunnel connection become available. Another connectivity event occurs when the first tunnel connection and the second tunnel connection become unavailable.

A connectivity event may be related to one or more connections. For example, a user may be associated with five virtual private network (VPN) connections. In this example, the connectivity event may occur when at least three of the five VPN connections becomes disconnected. Thus, in this embodiment, if only two of the five VPN connections fail, then a notification will not be sent. But if three or more of the five VPN connections fail, then a notification will be sent. A connectivity subscription request can be submitted in any number of ways. In an embodiment, the connectivity subscription request may be submitted via an application programming interface (API) call. In another embodiment, the connectivity subscription request may be submitted via a web-based application.

Referring back to FIG. 5, after receiving a connectivity subscription request 510, the method 500 proceeds to block 520. In block 520 connectivity data is collected. Connectivity data may be collected by any number of devices. In an embodiment, connectivity data may be collected by a device related to one or more connections. For example, referring to FIG. 4, the gateway 420 may collect information related to one or more VPN connections. In another embodiment, a server or other computing device may collect connectivity data. For example, in FIG. 4, the server 405 may collect connectivity data by monitoring communications related to the connection, polling the gateway 420 for information, or performing other diagnostics.

Connectivity data may be collected in any number of ways. In an embodiment, connectivity data may be collected by monitoring traffic over one or more connections. In some embodiments, connectivity data can be collected over one or more tunnels related to a connection. For example, referring to FIG. 4, the gateway 420 may have a VPN connection with a first tunnel connection and a second tunnel connection similar to the embodiment shown in FIG. 1. In this embodiment, the gateway 420 may collect information related to the first tunnel connection or the second tunnel connection, or both. Connectivity data can be actively collected by one or more devices. Actively collecting connectivity data may include any number of actions that can be performed by the one or more devices. For example, referring to FIG. 4, the gateway 420 may send one or more packets to a destination device related to a connection. In this example, the gateway 420 may collect information related to whether any communication is received in response to the sent packets. In an embodiment, connectivity data may be collected by performing a ping, traceroute, or other diagnostic procedure.

In an embodiment, executable instructions stored on one or more devices may be executed that enables connectivity data to be collected. For example, in FIG. 4, executable instructions stored in the memory 425 of the gateway 420 may be executed by the processor 430 that enables connectivity data to be collected. The instructions may comprise processor-specific instructions generated by a compiler and/or an interpreter from code written in any suitable computer-programming language including, for example, C, C++, C#, Visual Basic, Java®, Python, Perl, JavaScript, and ActionScript®.

Connectivity data may include numerous types of data. For example, connectivity data may contain information including, but not limited to, interne protocol (IP) addresses, media access control (MAC) addresses, whether a connection was successful, the number of tunnels in a connection, a type of encryption, a strength of encryption, connection length, connection speed, bandwidth available, bandwidth used, number of connections, type of connections, traffic direction, port numbers, host names, dates, times, packets received, response time, route information, or a combination thereof.

Referring back to FIG. 5, after collecting connectivity data 520, the method 500 proceeds to block 530. In block 530 connectivity data is stored. Connectivity data may be stored in any number of devices. For example, referring to FIG. 4, connectivity data may be stored in the server 405, the gateway 420, the data store 445, or a combination thereof. Connectivity data can be stored in any number of formats or language. For example, data may be stored in a text file or in a tag-based format such as XML. In an embodiment, data may be stored in an archive or compressed format, or both, such as JAR, ZIP, RAR, ISO, or TAR. Connectivity data can be stored in memory or on a disk drive.

In FIG. 5, after storing connectivity data 530, the method 500 proceeds to block 540. In block 540, a determination as to whether a connectivity event has occurred is made. If it is determined that a connectivity event has occurred, then the method 500 proceeds to block 560. Otherwise, the method 500 stops 550.

Determining whether a connectivity event has occurred 540 may be done by any number of devices. One or more servers may be used to determine whether a connectivity event has occurred. For example, referring to FIG. 4, server 405 may determine whether a connectivity event has occurred. One or more gateways may be used in determining whether a connectivity event has occurred. In an embodiment, both server 405 and gateway 420 are used to determine whether a connectivity event has occurred. One or more data stores may be accessed in determining whether a connectivity event has occurred. For example, server 405 may query data store 445 to determine whether a connection related to a connectivity subscription request has been disconnected for a time period specified by the connectivity subscription request. In an embodiment, data store 445 may be queried by gateway 420 to determine whether a connectivity event related to a connectivity subscription request requires that a certain number of tunnels associated with a connection be unavailable. In embodiments, data received in a connectivity subscription request, collected connectivity data, information saved in a data store, other information, or a combination thereof may be used to determine whether a connectivity event has occurred.

Referring back to FIG. 5, after determining that a connectivity event has occurred, the method 500 proceeds to block 560. In block 560 a connectivity notification is sent. A connectivity notification may be sent by any number of devices. A connectivity notification may be sent by a server or by a gateway. For example, referring to FIG. 4, a connectivity notification may be sent by gateway 420. In one embodiment, a connectivity notification may be sent by server 405. A connectivity notification may be sent to any number of devices. For example, in one embodiment, a connectivity notification may be emailed to one or more email addresses. In another embodiment, a connectivity notification may be sent via text message to one or more numbers. A connectivity notification can be sent to one or more telephone numbers via an automated voice notification. In one embodiment, a connectivity notification is sent via an application programming interface.

A connectivity notification can provide numerous types of information. For example, a connectivity notification may contain information related to the connectivity event. A connectivity notification can include information such as a time that the connectivity event occurred or was detected. A connectivity notification may include information including, but not limited to, internet protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A connectivity notification can include information stored in a data store. In one embodiment, a connectivity notification includes information regarding a user or an account associated with the connectivity event. One or more data stores may be accessed for determining information to include in a connectivity notification. One or more data stores may have information stored needed for connectivity notification.

Figure 6:
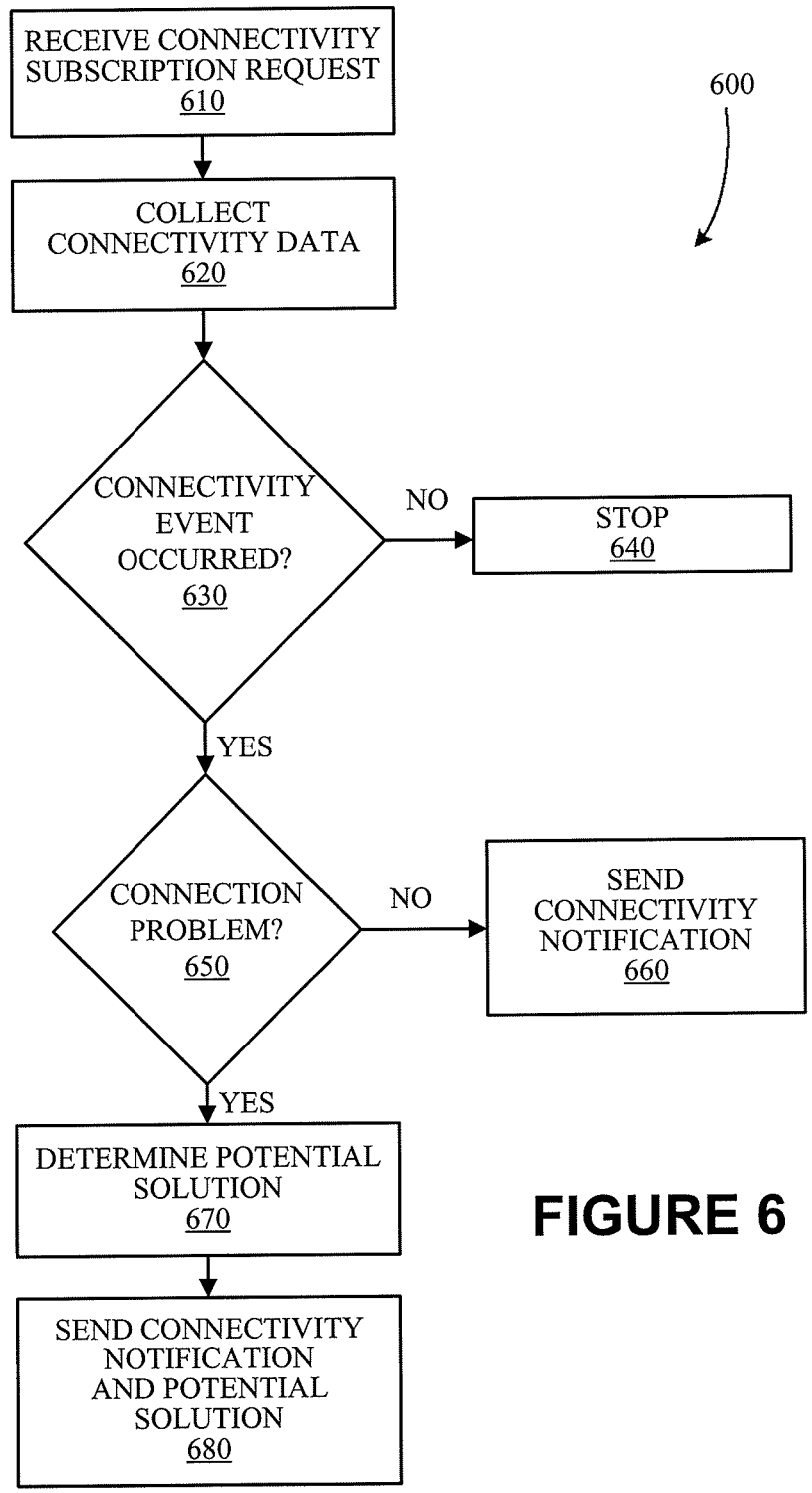
FIG. 6 is a flowchart illustrating a method of subscribing to and receiving connectivity notifications according to an embodiment.

FIG. 6 illustrates a method 600 of subscribing to and receiving connectivity notifications according to an embodiment. The description of the method 600 shown in FIG. 6 will be made with respect to FIG. 4, which illustrates an example environment 400 for implementing aspects in accordance with various embodiments. It should be noted, however, that the scope of the present disclosure is not limited to the explicit environment illustrated in FIG. 4, but in other environments, including variations of FIG. 4 not explicitly illustrated or described.

The method 600 shown in FIG. 6 begins when a connectivity subscription request is received 610. For example, referring to FIG. 4, the user device 415 may send a connectivity subscription request to the server 405. In embodiments, a connectivity subscription request may include identification information. For example, a connectivity subscription request can include authentication information, such as a username and a password. In this embodiment, if the server 405 receives a connectivity subscription request from the user device 415, the server 405 may verify the username and password in the request with information contained in the data store 445. In another embodiment, a connectivity subscription request may include a key or other unique identification that can be used to verify the user submitting the connectivity subscription request and verify that the user has sufficient privileges to access information requested by the request.

A connectivity subscription request may include information related to a connectivity event for one or more connections. For example, a connectivity subscription request can include a request to receive a notification when a connectivity event occurs. A connectivity event can include any number of actions related to one or more connections. In one embodiment, a connectivity event occurs when one or more connections becomes available. For example, a connectivity event may occur when one connection becomes available. In other embodiments, a connectivity event may occur when two or more connections each become available. In an embodiment, a connectivity event occurs when one or more connections becomes unavailable. For example, a connectivity event may occur when a single connection becomes disconnected. A connectivity event can occur when two or more connections each becomes unavailable.

In embodiments, a connectivity event occurs when a portion of a connection becomes available or unavailable. A connection may be redundant. For example, a VPN connection may contain a first tunnel connection and a second tunnel connection such that if the first connection become unavailable, the VPN connection may still send and receive communications through the second tunnel connection. In this embodiment, a connectivity event can occur when the first tunnel connection or the second tunnel connection becomes available. In another embodiment, a connectivity event occurs when the first tunnel connection or the second tunnel connection becomes unavailable. One connectivity event occurs when both the first tunnel connection and the second tunnel connection become established. Another connectivity event occurs when the first tunnel connection and the second tunnel connection become unavailable.

A connectivity event may be related to one or more connections. For example, a user may be associated with five virtual private network (VPN) connections. In this example, the connectivity event may occur when at least three of the five VPN connections becomes unavailable. Thus, in this embodiment, if only two of the five VPN connections fail, then a notification will not be sent. But if three or more of the five VPN connections fail, then a notification will be sent.

Referring back to FIG. 6, after receiving a connectivity subscription request 610, the method 600 proceeds to block 620. In block 620 connectivity data is collected. Connectivity data may be collected by any number of devices. In an embodiment, connectivity data may be collected by a device related to one or more connections. For example, referring to FIG. 4, the gateway 420 may collect information related to one or more VPN connections. In another embodiment, a server or other computing device may collect connectivity data. For example, in FIG. 4, the server 405 may collect connectivity data by monitoring communications related to the connection, polling the gateway 420 for information, or performing other diagnostics.

Connectivity data may be collected in any number of ways. In an embodiment, connectivity data may be collected by monitoring traffic over one or more connections. In some embodiments, connectivity data can be collected over one or more tunnels related to a connection. For example, referring to FIG. 4, the gateway 420 may have a VPN connection with a first tunnel connection and a second tunnel connection similar to the embodiment shown in FIG. 1. In this embodiment, the gateway 420 may collect information related to the first tunnel connection or the second tunnel connection, or both.

Connectivity data can be actively collected by one or more devices. Actively collecting connectivity data may include any number of actions that can be performed by one or more devices. For example, referring to FIG. 4, the gateway 420 may send one or more packets to a destination device related to a connection. In this example, the gateway 420 may collect information related to whether any communication is received in response to the sent packets. In an embodiment, connectivity data may be collected by performing a ping, traceroute, or other diagnostic procedure.

In an embodiment, executable instructions stored on one or more devices may be executed that enables connectivity data to be collected. For example, in FIG. 4, executable instructions stored in the memory 425 of the gateway 420 may be executed by the processor 430 that enables connectivity data to be collected. The instructions may comprise processor-specific instructions generated by a compiler and/or an interpreter from code written in any suitable computer-programming language including, for example, C, C++, C#, Visual Basic, Java®, Python, Perl, JavaScript, and ActionScript®.

Connectivity data may include numerous types of data. For example, connectivity data may contain information including, but not limited to, internet protocol (IP) addresses, media access control (MAC) addresses, whether a connection was successful, the number of tunnels in a connection, a type of encryption, a strength of encryption, connection length, connection speed, bandwidth available, bandwidth used, number of connections, type of connections, traffic direction, port numbers, host names, dates, times, packets received, response time, route information, or a combination thereof.

Referring back to FIG. 6, after collecting connectivity data 620, the method 600 proceeds to block 630. In block 630 a determination is made as to whether a connectivity event has occurred. If it is determined that a connectivity event has occurred, then the method 600 proceeds to block 650. Otherwise, the method 600 stops 640.

Determining whether a connectivity event has occurred 630 may be done by any number of devices. One or more servers may be used to determine whether a connectivity event has occurred. For example, referring to FIG. 4, server 405 may determine whether a connectivity event has occurred. One or more gateways may be used in determining whether a connectivity event has occurred. In an embodiment, both server 405 and gateway 420 are used to determine whether a connectivity event has occurred. One or more data stores may be accessed in determining whether a connectivity event has occurred. For example, server 405 may query data store 445 to determine whether a connection related to a connectivity subscription request has been disconnected for a time period specified by the connectivity subscription request. In an embodiment, data store 445 may be queried by gateway 420 to determine whether a connectivity event related to a connectivity subscription request requires that a certain number of tunnels associated with a connection be unavailable. In embodiments, data received in a connectivity subscription request, collected connectivity data, information saved in a data store, other information, or a combination thereof may be used to determine whether a connectivity event has occurred.

After determining that a connectivity event has occurred, the method 600 proceeds to block 650. In block 650, a determination as to whether a connection problem has occurred is made. If it is determined that a connection problem has occurred, then the method 600 proceeds to block 670. Otherwise, the method 600 proceeds to block 660. Determining whether a connection problem has occurred 650 may be done by any number of devices. One or more servers may be used to determine whether a connection problem has occurred. For example, referring to FIG. 4, server 405 may determine whether a connection problem has occurred. One or more gateways may be used in determining whether a connection problem has occurred. In an embodiment, both server 405 and gateway 420 are used to determine whether a connection problem has occurred. One or more data stores may be accessed in determining whether a connection problem has occurred. For example, server 405 may query data store 445 to determine whether a connection related to a connectivity subscription request has been disconnected for a specified period of time and this information may be used in determining whether a connection problem has occurred. In an embodiment, data store 445 may be queried by gateway 420 to determine whether a connection having a certain number of tunnels has one or more tunnels that are disconnected. In embodiments, data received in a connectivity subscription request, collected connectivity data, information saved in a data store, other information, or a combination thereof may be used to determine whether a connection problem has occurred.

Referring back to FIG. 6, if it is determined that a connection problem has not occurred, the method 600 proceeds to block 660. In block 660, a connectivity notification is sent. A connectivity notification may be sent by any number of devices. A connectivity notification may be sent by a server or by a gateway. For example, referring to FIG. 4, a connectivity notification may be sent by gateway 420. In one embodiment, a connectivity notification may be sent by server 405. A connectivity notification may be sent to any number of devices. For example, in one embodiment, a connectivity notification may be emailed to one or more email addresses. In another embodiment, a connectivity notification may be sent via text message to one or more numbers. A connectivity notification can be sent to one or more telephone numbers via an automated voice notification. In one embodiment, a connectivity notification is sent via an application programming interface.

A connectivity notification can provide numerous types of information. For example, a connectivity notification may contain information related to the connectivity event. A connectivity notification can include information such as a time that the connectivity event occurred or was detected. A connectivity notification may include information including, but not limited to, internet protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A connectivity notification can include information stored in a data store. In one embodiment, a connectivity notification includes information regarding a user or an account associated with the connectivity event. One or more data stores may be accessed for determining information to include in a connectivity notification. One or more data stores may have information stored that may be needed for a connectivity notification.

Referring back to FIG. 6, if it is determined that a connection problem has occurred, then the method 600 proceeds to block 670. In block 670, a potential solution to the connection problem is determined. Determining a potential solution to a connection problem 670 may be performed by any number of devices. One or more servers may be used to determine a potential solution to a connection problem. For example, referring to FIG. 4, server 405 may determine a potential solution to a connection problem. One or more gateways may be used to determine a potential solution to a connection problem. In an embodiment, both server 405 and gateway 420 are used to determine a potential solution to a connection problem. One or more data stores may be accessed in determining a potential solution to a connection problem. For example, data store 445 may contain information regarding potential connection problems and potential solutions for the potential connection problems. Thus, in an embodiment, server 405 may query data store 445 to determine a potential solution to a connection problem. In an embodiment, data store 445 may be queried by gateway 420 to determine a potential solution to a connection problem. For example, if a connection has two tunnels and one tunnel is disconnected, information may be contained in data store 445 regarding potential solutions to restore connectivity to the disconnected tunnel. In embodiments, data received in a connectivity subscription request, collected connectivity data, information saved in a data store, other information, or a combination thereof may be used to determine a potential solution to a connection problem.

In FIG. 6, after determining a potential solution to the connection problem, the method 600 proceeds to block 680. In block 680 a connectivity notification and a potential solution is sent. A connectivity notification may be sent by any number of devices. A connectivity notification may be sent by a server or by a gateway. For example, referring to FIG. 4, a connectivity notification may be sent by gateway 420. In one embodiment, a connectivity notification may be sent by server 405. A connectivity notification may be sent to any number of devices. For example, in one embodiment, a connectivity notification may be emailed to one or more email addresses. In another embodiment, a connectivity notification may be sent via text message to one or more numbers. A connectivity notification can be sent to one or more telephone numbers via an automated voice notification. In one embodiment, a connectivity notification is sent via an application programming interface.

A connectivity notification can provide numerous types of information. For example, a connectivity notification may contain information related to the connectivity event. A connectivity notification can include information such as a time that the connectivity event occurred or was detected. A connectivity notification may include information including, but not limited to, internet protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A connectivity notification can include information stored in a data store. In one embodiment, a connectivity notification includes information regarding a user or an account associated with the connectivity event. One or more data stores may be accessed for determining information to include in a connectivity notification. One or more data stores may have information stored needed for connectivity notification. A connectivity notification and a potential solution may be sent separately. Thus, a user may be sent a connectivity notification and then sent a potential solution, or vice versa. In other embodiments, a connectivity notification includes a potential solution.

In embodiments, one or more of method steps 610-680 of method 600 may be performed in association with a plurality of connections. For example, connectivity data related to a plurality of connections may be collected in block 620 of method 600. In one embodiment, a determination as to whether a connectivity event has occurred 630 may be based on collected connectivity data associated with a plurality of connections. For example, a determination may be made that a connectivity event has occurred 630 based on whether at least a portion of the plurality of connections are connected. In one embodiment, if one or more of the plurality of connections are disconnected then a determination may be made that a connectivity event for one or more of the connections has occurred 630. In another embodiment, a determination may be made that a connectivity event has occurred 630 when each of the plurality of connections are disconnected. One or more connection problems 650 may be determined based on connectivity data associated with a plurality of connections. For example, collected connectivity data may indicate that at least a portion of the plurality of connections have the same problem or similar problems. In one embodiment, a solution may be determined 670 based on one or more connection problems related to a plurality of connections. For example, if a plurality of connections associated with a router are disconnected, then it may be determined that a common problem related to the plurality of connections exists. Such a common problem may be that the router has lost power, needs to be rebooted, has lost connectivity with another network such as the Internet, or one or more other problems. In this embodiment, a potential solution can include rebooting the router, replacing the router, updating firmware on the router, or other potential solutions. Thus, in embodiments, connectivity data related to a plurality of connections may be collected and used to determine one or more connection problems. In some embodiments, connectivity data related to a plurality of connections is used to determine one or more potential solutions to one or more connection problems. Other variations are within the scope of this disclosure.

Figure 7:
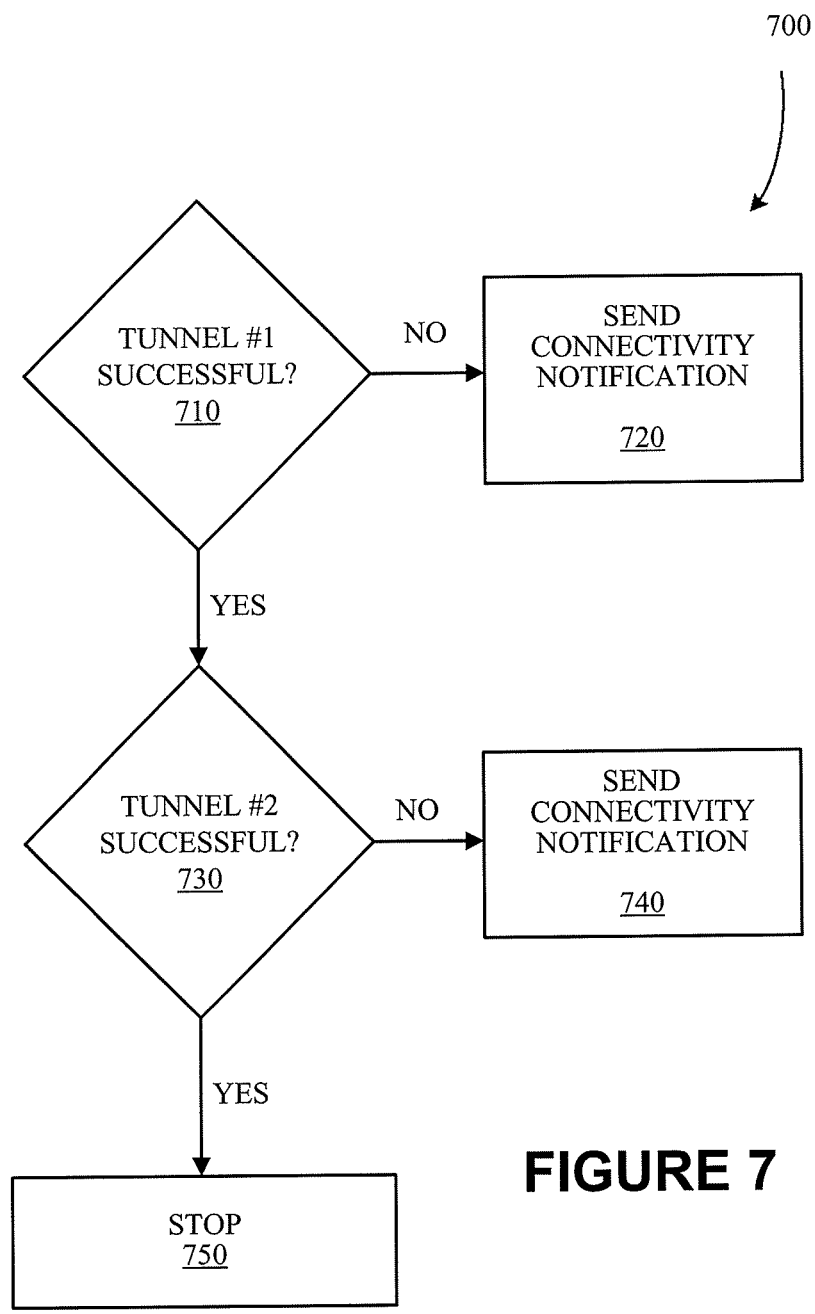
FIG. 7 is a flowchart illustrating a method of detecting and sending a connectivity notification according to an embodiment.

FIG. 7 illustrates a method 700 of detecting and sending a connectivity notification for a connection having a first tunnel connection and a second tunnel connection according to an embodiment. The description of the method 700 shown in FIG. 7 will be made with respect to FIG. 1, which illustrates an example environment 100 for implementing aspects in accordance with various embodiments. It should be noted, however, that the scope of the present disclosure is not limited to the explicit environment illustrated in FIG. 1, but in other environments, including variations of FIG. 1 not explicitly illustrated or described.

The method 700 shown in FIG. 7 begins with a determination as to whether a first tunnel connection is successful 710. If it is determined that the first tunnel connection is unsuccessful, then the method 700 proceeds to block 720. Otherwise, the method 700 proceeds to block 730. Determining whether a first tunnel connection is successful or unsuccessful may be performed any number of ways. In an embodiment, one or more packets can be sent by a first device associated with the connection over the first tunnel connection to a second device associated with the connection. In this embodiment, the first device may wait a period of time. If a response is received from the second device within the period of time, then the first device may determine that the first tunnel connection is successful. If a response is not received from the second device within the period of time, then the first device may determine that the first tunnel connection is unsuccessful. For example, in FIG. 1, the private gateway 140 may send one or more packets to user gateway 120 and wait for a response to determine whether a first tunnel connection is successful. The private gateway 140 may send one or more packets to a device associated with the user network 110 and wait for a response to determine whether a first tunnel connection is successful. In one embodiment, a first device associated with private network 170 may send one or more packets to a device associated with user network 110 and wait for a response to determine whether a first tunnel connection is successful.

In embodiments, traffic being sent and received over the first tunnel connection may be monitored to determine whether the first tunnel connection is successful. For example, in FIG. 1, the private gateway 140 or a device associated with private network 170 may monitor traffic in the first tunnel connection 155 to determine whether the first tunnel connection is successful. In this embodiment, if traffic is being sent and received through the first tunnel connection 155, then the device or devices monitoring traffic for the first tunnel connection 155 may determine that the first tunnel connection 155 is successful. If the device or devices monitoring traffic for the first tunnel connection 155 does not detect any traffic for a period of time or if the traffic is only in one direction, then the device or devices may determine that the first tunnel connection 155 is unsuccessful.

Referring back to FIG. 7, if it is determined that the first tunnel connection is unsuccessful, then the method 700 proceeds to block 720. In block 720, a connectivity notification is sent. A connectivity notification may be sent by any number of devices. A connectivity notification may be sent by a server or by a gateway. For example, referring to FIG. 4, a connectivity notification may be sent by gateway 420. In one embodiment, a connectivity notification may be sent by server 405. A connectivity notification may be sent to any number of devices. For example, in one embodiment, a connectivity notification may be emailed to one or more email addresses. In another embodiment, a connectivity notification may be sent via text message to one or more numbers. A connectivity notification can be sent to one or more telephone numbers via an automated voice notification. In one embodiment, a connectivity notification is sent via an application programming interface.

A connectivity notification can provide numerous types of information. For example, a connectivity notification may contain information related to the connectivity event. A connectivity notification can include information such as a time that the connectivity event occurred or was detected. A connectivity notification may include information including, but not limited to, internet protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A connectivity notification can include information stored in a data store. In one embodiment, a connectivity notification includes information regarding a user or an account associated with the connectivity event. One or more data stores may be accessed for determining information to include in a connectivity notification. One or more data stores may have information stored needed for connectivity notification.

For example, in FIG. 7, the connectivity notification 720 may indicate that at least one tunnel connection 710 in a connection is unsuccessful. In embodiments, additional steps may be taken to determine whether the connection is at least partially operational or whether the connection is entirely unsuccessful and such information may be included in the connectivity notification. Historical information such as the last time traffic was successfully sent or received, or both, over the first tunnel connection that is currently unsuccessful may be included in the connectivity notification request.

Referring back to FIG. 7, if it is determined that the first tunnel connection is successful, then the method 700 proceeds to block 730. In block 730, a determination is made as to whether a second tunnel connection is successful. If it is determined that the second tunnel connection is unsuccessful, then the method 700 proceeds to block 740. Otherwise, the method 700 stops 750. Determining whether a second tunnel connection is successful or unsuccessful may be performed any number of ways. In an embodiment, one or more packets can be sent by a first device associated with the connection over the second tunnel connection to a second device associated with the connection. In this embodiment, the first device may wait a period of time. If a response is received from the second device within the period of time, then the first device may determine that the second tunnel connection is successful. If a response is not received from the second device within the period of time, then the first device may determine that the second tunnel connection is unsuccessful. For example, in FIG. 1, the private gateway 140 may send one or more packets to user gateway 120 and wait for a response to determine whether a second tunnel connection is successful. The private gateway 140 may send one or more packets to a device associated with the user network 110 and wait for a response to determine whether a second tunnel connection is successful. In one embodiment, a first device associated with private network 170 may send one or more packets to a device associated with user network 110 and wait for a response to determine whether a second tunnel connection is successful.

In embodiments, traffic being sent and received over the first tunnel connection may be monitored to determine whether the second tunnel connection is successful. For example, in FIG. 1, the private gateway 140 or a device associated with private network 170 may monitor traffic in the second tunnel connection 160 to determine whether the second tunnel connection is successful. In this embodiment, if traffic is being sent and received through the second tunnel connection 160, then the device or devices monitoring traffic for the second tunnel connection 160 may determine that the first tunnel connection 160 is successful. If the device or devices monitoring traffic for the second tunnel connection 160 does not detect any traffic for a period of time or if the traffic is only in one direction, then the device or devices may determine that the second tunnel connection 160 is unsuccessful.

Referring back to FIG. 7, if it is determined that the second tunnel connection is unsuccessful, then the method 700 proceeds to block 740. In block 740, a connectivity notification is sent. A connectivity notification may be sent by any number of devices. A connectivity notification may be sent by a server or by a gateway. For example, referring to FIG. 4, a connectivity notification may be sent by gateway 420. In one embodiment, a connectivity notification may be sent by server 405. A connectivity notification may be sent to any number of devices. For example, in one embodiment, a connectivity notification may be emailed to one or more email addresses. In another embodiment, a connectivity notification may be sent via text message to one or more numbers. A connectivity notification can be sent to one or more telephone numbers via an automated voice notification. In one embodiment, a connectivity notification is sent via an application programming interface.

A connectivity notification can provide numerous types of information. For example, a connectivity notification may contain information related to the connectivity event. A connectivity notification can include information such as a time that the connectivity event occurred or was detected. A connectivity notification may include information including, but not limited to, internet protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A connectivity notification can include information stored in a data store. In one embodiment, a connectivity notification includes information regarding a user or an account associated with the connectivity event. One or more data stores may be accessed for determining information to include in a connectivity notification. One or more data stores may have information stored needed for connectivity notification.

For example, in FIG. 7, the connectivity notification may indicate that at least two tunnel connections in a connection are unsuccessful. In embodiments where a connection includes two tunnel connections, the connectivity notification may indicate that the connection is unsuccessful. Such a connectivity notification may have a higher priority than at least some other connectivity notifications at least because the entire connection is unavailable. Thus, in embodiments, one or more connectivity notifications may have a higher or lower priority based on the severity, urgency, or other factors related to a connectivity event or connectivity notification. Historical information such as the last time traffic was successfully sent or received, or both, over the first tunnel connection or the second tunnel connection may be included in a connectivity notification request.

Figure 8:
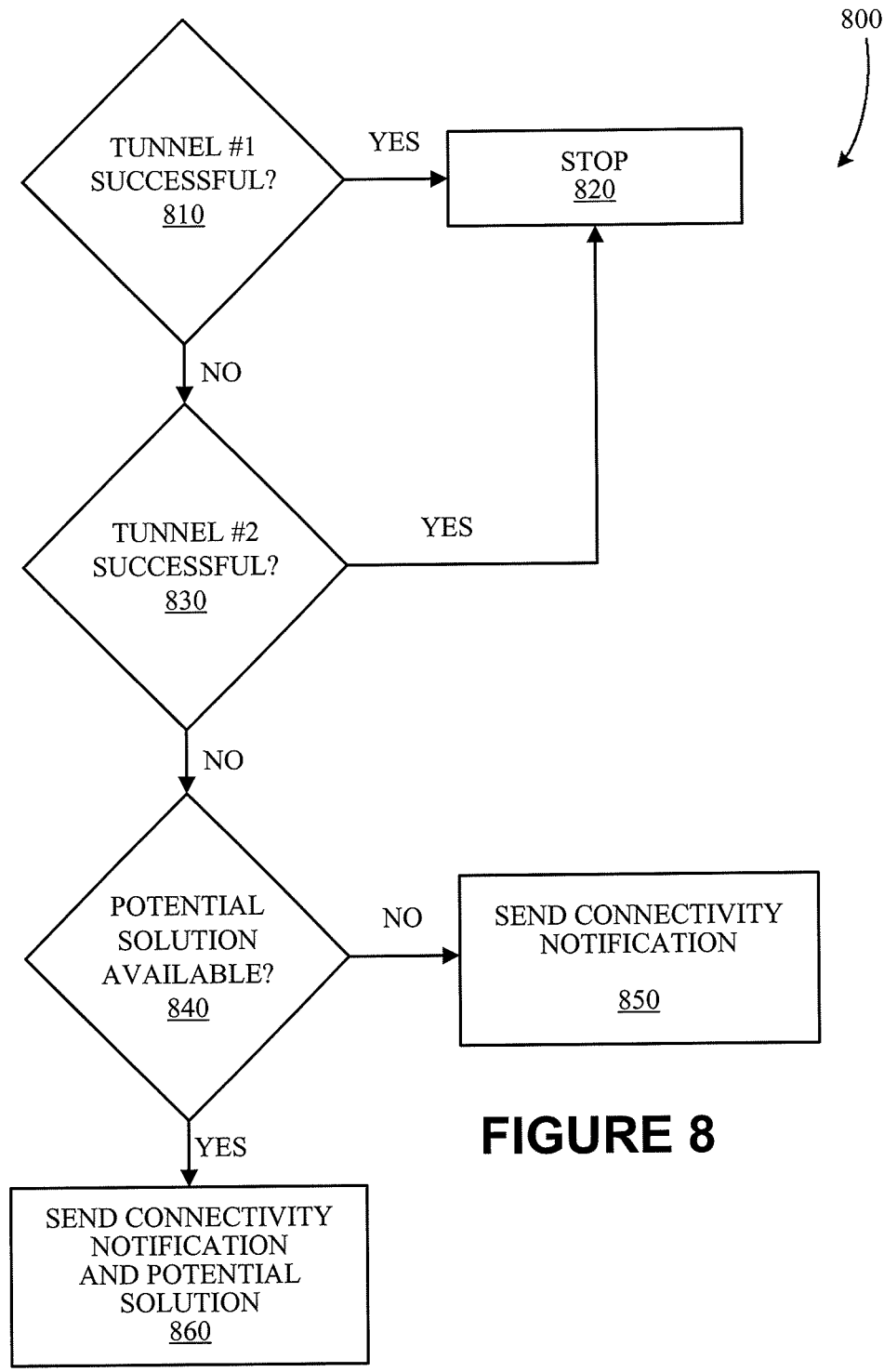
FIG. 8 is a flowchart illustrating a method of detecting and sending a connectivity notification according to an embodiment.

FIG. 8 illustrates a method 800 of detecting and sending a connectivity notification for a connection having a first tunnel connection and a second tunnel connection according to an embodiment. The description of the method 800 shown in FIG. 8 will be made with respect to FIG. 1, which illustrates an example environment 100 for implementing aspects in accordance with various embodiments. It should be noted, however, that the scope of the present disclosure is not limited to the explicit environment illustrated in FIG. 1, but in other environments, including variations of FIG. 1 not explicitly illustrated or described.

The method 800 shown in FIG. 8 begins with a determination as to whether a first tunnel connection is successful 810. If it is determined that the first tunnel connection is unsuccessful, then the method 800 proceeds to block 830. Otherwise, the method 800 stops 820.

Determining whether a first tunnel connection is successful or unsuccessful may be performed any number of ways. In an embodiment, one or more packets can be sent by a first device associated with the connection over the first tunnel connection to a second device associated with the connection. In this embodiment, the first device may wait a period of time. If a response is received from the second device within the period of time, then the first device may determine that the first tunnel connection is successful. If a response is not received from the second device within the period of time, then the first device may determine that the first tunnel connection is unsuccessful. For example, in FIG. 1, the private gateway 140 may send one or more packets to user gateway 120 and wait for a response to determine whether a first tunnel connection is successful. The private gateway 140 may send one or more packets to a device associated with the user network 110 and wait for a response to determine whether a first tunnel connection is successful. In one embodiment, a first device associated with private network 170 may send one or more packets to a device associated with user network 110 and wait for a response to determine whether a first tunnel connection is successful.

In embodiments, traffic being sent and received over the first tunnel connection may be monitored to determine whether the first tunnel connection is successful. For example, in FIG. 1, the private gateway 140 or a device associated with private network 170 may monitor traffic in the first tunnel connection 155 to determine whether the first tunnel connection is successful. In this embodiment, if traffic is being sent and received through the first tunnel connection 155, then the device or devices monitoring traffic for the first tunnel connection 155 may determine that the first tunnel connection 155 is successful. If the device or devices monitoring traffic for the first tunnel connection 155 does not detect any traffic for a period of time or if the traffic is only in one direction, then the device or devices may determine that the first tunnel connection 155 is unsuccessful.

Referring back to FIG. 8, if it is determined that the first tunnel connection is unsuccessful, then the method 800 proceeds to block 830. In block 830, a determination as to whether a second tunnel connection is successful. If it is determined that the second tunnel connection is unsuccessful, then the method 800 proceeds to block 840. Otherwise, the method 800 stops 820.

Determining whether a second tunnel connection is successful or unsuccessful may be performed any number of ways. In an embodiment, one or more packets can be sent by a first device associated with the connection over the second tunnel connection to a second device associated with the connection. In this embodiment, the first device may wait a period of time. If a response is received from the second device within the period of time, then the first device may determine that the second tunnel connection is successful. If a response is not received from the second device within the period of time, then the first device may determine that the second tunnel connection is unsuccessful. For example, in FIG. 1, the private gateway 140 may send one or more packets to user gateway 120 and wait for a response to determine whether a second tunnel connection is successful. The private gateway 140 may send one or more packets to a device associated with the user network 110 and wait for a response to determine whether a second tunnel connection is successful. In one embodiment, a first device associated with private network 170 may send one or more packets to a device associated with user network 110 and wait for a response to determine whether a second tunnel connection is successful.

In embodiments, traffic being sent and received over the first tunnel connection may be monitored to determine whether the second tunnel connection is successful. For example, in FIG. 1, the private gateway 140 or a device associated with private network 170 may monitor traffic in the second tunnel connection 160 to determine whether the second tunnel connection is successful. In this embodiment, if traffic is being sent and received through the second tunnel connection 160, then the device or devices monitoring traffic for the second tunnel connection 160 may determine that the first tunnel connection 160 is successful. If the device or devices monitoring traffic for the second tunnel connection 160 does not detect any traffic for a period of time or if the traffic is only in one direction, then the device or devices may determine that the second tunnel connection 160 is unsuccessful.

Referring back to FIG. 8, if it is determined that the second tunnel connection is unsuccessful, then the method 800 proceeds to block 840. In block 840, a determination as to whether a potential solution is available. If it is determined that a potential solution is not available, then the method 800 proceeds to block 850. Otherwise, the method 800 proceeds to block 860.

Determining whether a potential solution is available may be performed by any number of devices or in any number of ways. Determining whether a potential solution is available may be performed by a server related to the connection. The server may access a data store containing information about the connection, similar connection problems, historical information, or potential solutions. For example, in FIG. 4, server 405 may determine whether a potential solution is available and may query data store 445 in doing so. In another embodiment, gateway 420 may determine whether a potential solution is available and may query data store 445 for information when making the determination.

A potential solution can include any number of possible solutions to one or more potential connection problems. In one embodiment, a potential solution may be a single solution to a single potential connection problem. A potential solution may provide numerous possible solutions to a potential connection problem. In an embodiment, a potential solution includes numerous possible solutions to numerous potential problems related to one or more connections or portions of one or more connections. In one embodiment, a potential solution may rank possible solutions in an order of likely solutions. For example, if four possible solutions to a potential connection problem are determined, then a potential solution may list the most probable solution first and the least probable solution last.

A potential solution can include information or instructions related to restoring connectivity for a potential connection problem. For example, if no IKE security association exists, then one potential solution may be to verify the IKE configuration settings to make sure that the encryption, authentication, and mode parameters are correctly configured. If an IPsec security association does not exist, then one potential solution may be to verify that the IPsec security association configuration is properly configured. If there is no IP connectivity via a tunnel in a connection, then a potential solution may be to verify that the tunnel interface configuration is properly configured. If a BGP status associated with a connection is not active, then the BGP configuration may need to be verified. Additional problems and potential solutions are within the scope of this disclosure.

Referring back to FIG. 8, if it is determined that a potential solution is not available, then the method 800 proceeds to block 850. In block 850, a connectivity notification is sent. A connectivity notification may be sent by any number of devices. A connectivity notification may be sent by a server or by a gateway. For example, referring to FIG. 4, a connectivity notification may be sent by gateway 420. In one embodiment, a connectivity notification may be sent by server 405. A connectivity notification may be sent to any number of devices. For example, in one embodiment, a connectivity notification may be emailed to one or more email addresses. In another embodiment, a connectivity notification may be sent via text message to one or more numbers. A connectivity notification can be sent to one or more telephone numbers via an automated voice notification. In one embodiment, a connectivity notification is sent via an application programming interface.

A connectivity notification can provide numerous types of information. For example, a connectivity notification may contain information related to the connectivity event. A connectivity notification can include information such as a time that the connectivity event occurred or was detected. A connectivity notification may include information including, but not limited to, internet protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A connectivity notification can include information stored in a data store. In one embodiment, a connectivity notification includes information regarding a user or an account associated with the connectivity event. One or more data stores may be accessed for determining information to include in a connectivity notification. One or more data stores may have information stored needed for connectivity notification.

If it is determined that a potential solution is available, then the method 800 proceeds to block 860. In block 860, a connectivity notification and the potential solution is sent.

A connectivity notification may be sent by any number of devices. A connectivity notification may be sent by a server or by a gateway. For example, referring to FIG. 4, a connectivity notification may be sent by gateway 420. In one embodiment, a connectivity notification may be sent by server 405. A connectivity notification may be sent to any number of devices. For example, in one embodiment, a connectivity notification may be emailed to one or more email addresses. In another embodiment, a connectivity notification may be sent via text message to one or more numbers. A connectivity notification can be sent to one or more telephone numbers via an automated voice notification. In one embodiment, a connectivity notification is sent via an application programming interface.

A connectivity notification can provide numerous types of information. For example, a connectivity notification may contain information related to the connectivity event. A connectivity notification can include information such as a time that the connectivity event occurred or was detected. A connectivity notification may include information including, but not limited to, internet protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A connectivity notification can include information stored in a data store. In one embodiment, a connectivity notification includes information regarding a user or an account associated with the connectivity event. One or more data stores may be accessed for determining information to include in a connectivity notification. One or more data stores may have information stored needed for connectivity notification. A connectivity notification and a potential solution may be sent separately. Thus, a user may be sent and connectivity and then sent a potential solution, or vice versa. In other embodiments, a connectivity notification includes a potential solution.

Figure 9:
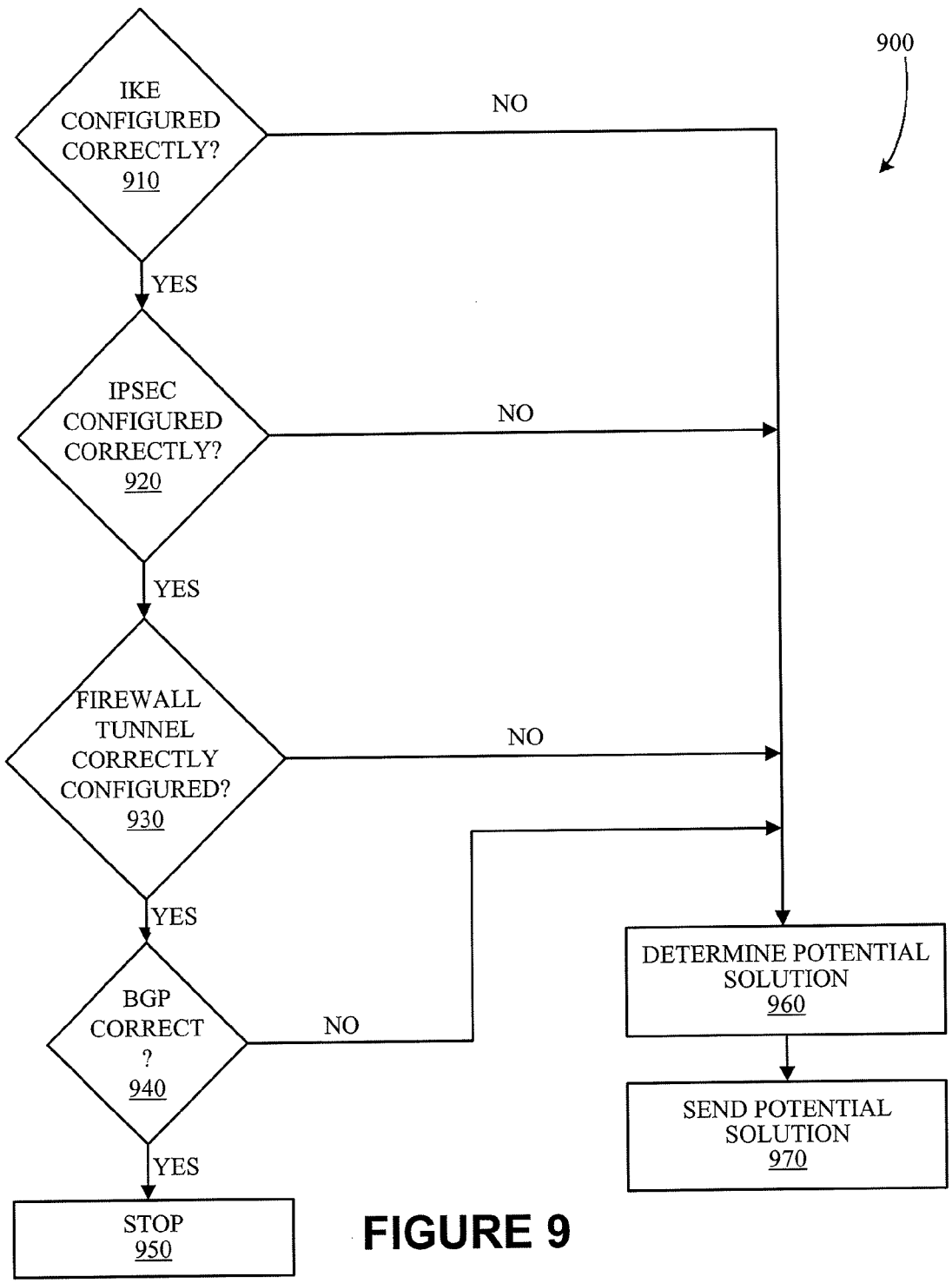
FIG. 9 is a flowchart illustrating a method of detecting a potential connectivity problem and sending a potential solution according to an embodiment.

FIG. 9 illustrates a method 900 of detecting a potential connectivity problem and sending a potential solution according to an embodiment. The description of the method 900 shown in FIG. 9 will be made with respect to FIG. 1, which illustrates an example environment 100 for implementing aspects in accordance with various embodiments. It should be noted, however, that the scope of the present disclosure is not limited to the explicit environment illustrated in FIG. 1, but in other environments, including variations of FIG. 1 not explicitly illustrated or described.

The method 900 shown in FIG. 9 begins with a determination as to whether an internet key exchange (IKE) is configured correctly 910. If it is determined that the IKE is configured correctly, then the method 900 proceeds to block 920. Otherwise, the method 900 proceeds to block 960.

A determination as to whether an internet key exchange is configured correctly may be made in any number of ways. In an embodiment, a determination as to whether an internet key exchange is configured correctly includes sending a command to a device related to the connection and receiving a response from the device. For example, in FIG. 1, the private gateway 140 may send a command or other request to user gateway 120 and receive a response back from the user gateway 120. In an embodiment, a command or a request sent to a device may include one or more of the following: "show crypto isakmp sa", "term mon", "debug crypto isakmp", "show security ike security-associations", "monitor start kmd", "scp usemame@router.hostname:/var/log/kmd", "get sa", "show ipsec sa gateway 1", "syslog debug on", "ipsec ike log message-info payload-info key-info", etc. In an embodiment, one or more commands or requests can be sent to a device based at least in part on a manufacturer of a device or a model number of a device.

A response received from a device may be parsed or otherwise analyzed in determining whether IKE is configured correctly. For example, a response may contain an src, state, status, or combination thereof, for one or more connections. In this embodiment, if the response indicates that no entries contain an src, then a determination may be made that IKE is not properly configured. Similarly, if the state of a connection is not QM_IDLE then a determination may be made that IKE is not properly configured. In one embodiment, if the status of a connection indicates that that connection is NOT ACTIVE then a determination may be made that IKE is not properly configured. In some embodiments, if a response contains no entries or additional entries than expected, then a determination may be made that IKE is not properly configured. In one embodiment, if a response includes one or more SPIs and if one or more if the SPIs has a hexadecimal number of 0000000, then a determination may be made that IKE is not properly configured.

In some embodiments, a data log may be sent as part of a response and information contained in the data log may be analyzed to determine whether IKE is properly configured. In an embodiment, one or more responses may vary depending on the manufacturer of the device or a model of the device. In this embodiment, a determination may be made as to whether IKE is configured correctly based at least in part on the information received from the request and the manufacturer or model number of the device. A response may indicate that the IKE connection is up, running, enabled, or otherwise functioning properly. Such information may be used to determine that IKE is correctly configured.

In an embodiment, one or more data stores contains information associated with a manufacture of a device, a model number of a device, and/or one or more requests or commands that should be sent to a device. Thus, one or more data stores may be queried to determine at least a portion of the requests or commands that should be sent to a device. In one embodiment, one or more data stores contains information associated with one or more expected responses. Thus, one or more data stores may be queried to determine whether a response indicates that the IKE is configured correctly.

Referring back to FIG. 9, if it is determined that the IKE is configured correctly, then the method 900 proceeds to block 920. In block 920, a determination as to whether IPsec is configured correctly. If it is determined that the IPsec is configured correctly, then the method 900 proceeds to block 930. Otherwise, the method 900 proceeds to block 960. A determination as to whether IPsec is configured correctly may be made in any number of way. In an embodiment, a determination as to whether IPsec is configured correctly includes sending a command to a device related to the connection and receiving a response from the device. For example, in FIG. 1, a server (not shown) related to private network 170 may send a command or other request to user gateway 120 and receive a response back from user gateway 120. In an embodiment, a command or a request sent to a device may include one or more of the following: "show crypto ipsec sa", "debug crypto ipsec", show security ipsec security-associations", "get sa", "show ipsec sa gateway 1 detail", "syslog debug on", "ipsec ike log message-info payload-info key-info", etc. In an embodiment, one or more commands or requests may be sent to a device based at least in part on a manufacturer of a device or a model number of a device.

A response received from a device may be parsed or otherwise analyzed in determining whether IPsec is configured correctly. For example, a response may include a security association (SA). In an embodiment, if the response does not include a SA then a determination may be made that IPsec is not configured correctly. In another embodiment, if a status received in the response indicates that the connection is not active, then a determination may be made that IPsec is not configured correctly. A response can include an "inbound esp sas" and an "outbound esp sas". In one embodiment, if a tunnel interface does not contain an inbound esp sas and an outbound esp sas, then a determination may be made that at least the tunnel interface of a connection has an IPsec that is not correctly configured. A response may contain multiple lines of data. In an embodiment, if at least two lines per address, such as an IP address, is not received in the response, a determination may be made that IPsec is not correctly configured.

In some embodiments, a data log may be sent as part of a response and information contained in the data log may be analyzed to determine whether IPsec is properly configured. In an embodiment, one or more responses may vary depending on the manufacturer of the device or a model of the device. In this embodiment, a determination may be made as to whether IPsec is configured correctly based at least in part on the information received from the request and the manufacturer or model number of the device. A response may indicate that the IPsec connection is up, running, enabled, or otherwise functioning properly. Such information may be used to determine that IPsec is correctly configured.

In an embodiment, one or more data stores contains information associated with a manufacture of a device, a model number of a device, and/or one or more requests or commands that should be sent to a device. Thus, one or more data stores may be queried to determine at least a portion of the requests or commands that should be sent to a device. In one embodiment, one or more data stores contains information associated with one or more expected responses. Thus, one or more data stores may be queried to determine whether a response indicates that the IPsec is configured correctly.

Referring back to FIG. 9, if it is determined that the IPsec is configured correctly, then the method 900 proceeds to block 930. In block 930, a determination is made as to whether a firewall or a tunnel, or both, are correctly configured. If it is determined that the firewall and tunnel are correctly configured, then the method 900 proceeds to block 940. If it is determined that the firewall is correctly configured and no determination is made as to whether the tunnel is correctly configured, then the method proceeds to block 940. If it is determined that the tunnel is correctly configured and no determination is made as to whether the firewall is correctly configured, then the method proceeds to block 940. Otherwise, the method 900 proceeds to block 960.

A determination as to whether a firewall and tunnel are correctly configured may be made in any number of ways. In an embodiment, a determination as to whether a firewall and tunnel are correctly configured includes sending a command to a device related to the connection and receiving a response from the device. For example, in FIG. 1, a server (not shown) related to private network 170 may send a command or other request to user gateway 120 and receive a response back from user gateway 120. In an embodiment, a command or a request sent to a device may include one or more of the following: "show interfaces tun#". "ping IP", "ping IP df-bit size 1410", "show interfaces st0.1", "ping IP size 1410 do-not-fragment". "show status tunnel #". In an embodiment, one or more commands or requests may be sent to a device based at least in part on a manufacturer of a device or a model number of a device.

A response received from a device may be parsed or otherwise analyzed in determining whether a firewall and tunnel are configured correctly. For example, a response may include a line protocol. In an embodiment, if the response indicates that the line protocol is not "UP" then a determination may be made that the firewall or tunnel, or both, are not correctly configured. In one embodiment, if a response indicates that "Tunnel protection via IPSec" is not present, then a determination may be made that the firewall or tunnel, or both, are not correctly configured. A response may include a specified number of characters. In an embodiment, if a response does not include five exclamation points ("!!!!!") then a determination may be made that the firewall or tunnel, or both, are not correctly configured. In another embodiment, if a security zone associated with the response does not match an expected security zone, then a determination may be made that the firewall or tunnel, or both, are not correctly configured. In one embodiment, if a response indicates that a link associated with a tunnel is not "ready", then a determination may be made that a firewall or tunnel, or both, are not correctly configured.

In some embodiments, a data log may be sent as part of a response and information contained in the data log may be analyzed to determine whether a firewall and a tunnel are properly configured. In an embodiment, one or more responses may vary depending on the manufacturer of the device or a model of the device. In this embodiment, a determination may be made as to whether a firewall and tunnel are configured correctly based at least in part on the information received from the request and the manufacturer or model number of the device. A response may indicate that a firewall or tunnel connection is up, running, enabled, or otherwise functioning properly. Such information may be used to determine that a firewall or tunnel, both, are correctly configured.

In an embodiment, one or more data stores contains information associated with a manufacture of a device, a model number of a device, and/or one or more requests or commands that should be sent to a device. Thus, one or more data stores may be queried to determine at least a portion of the requests or commands that should be sent to a device. In one embodiment, one or more data stores contains information associated with one or more expected responses. Thus, one or more data stores may be queried to determine whether a response indicates that a firewall and a tunnel are configured correctly.

In block 940, a determination is made as to whether a BGP is correctly configured. If it is determined that the BGP is not correctly configured, then the method 900 proceeds to block 960. Otherwise, the method 900 stops 950. A determination as to whether BGP is correctly configured may be made in any number of ways. In an embodiment, a determination as to whether BGP is correctly configured includes sending a command to a device related to the connection and receiving a response from the device. For example, in FIG. 1, a server (not shown) related to private network 170 may send a command or other request to user gateway 120 and receive a response back from user gateway 120. In an embodiment, a command or a request sent to a device may include one or more of the following: "show ip bgp summary", "show bpg all neighbors IP advertised-routes", "show ip route bgp", "show bgp summary", show bgp neighbor IP", "show route advertising-protocol bgp IP", "show route receive-protocol bgp IP", "get vrouter trust-yr protocol bgp neighbor", "get yr trust-yr prot bgp neigh IP", "get vr trust-yr protocol bgp rib neighbor IP advertised", "get yr trust-yr protocol bgp rib neighbor IP received", "show status bgp neighbor", show status bgp neighbor IP advertised-routes", "show ip route". In an embodiment, one or more commands or requests may be sent to a device based at least in part on a manufacturer of a device or a model number of a device.

A response received from a device may be parsed or otherwise analyzed in determining whether BGP is configured correctly. For example, a response may include a status. In an embodiment, if the value of a State/PfxRcd is not "1", then a determination may be made that BGP is not configured correctly. In one embodiment where BGP peering is up, a response may include a default route and if the default route is not "0.0.0.0/0", then a determination may be made that BGP is not configured correctly for a connection. In an embodiment, a prefix may be received in a response that needs to correspond with a predetermined prefix. If the prefix is not received or does not correspond with the predetermined prefix, then a determination may be made that BGP is not configured correctly. In an embodiment, a last state or last error, or both, may be received in a response that can be used to determine whether BGP is configured correctly.

In some embodiments, a data log may be sent as part of a response and information contained in the data log may be analyzed to determine whether BGP is configured correctly. In an embodiment, one or more responses may vary depending on the manufacturer of the device or a model of the device. In this embodiment, a determination may be made as to whether BGP is configured correctly based at least in part on the information received from the request and the manufacturer or model number of the device. A response may indicate that a firewall or tunnel connection is up, running, enabled, or otherwise functioning properly. Such information may be used to determine whether BGP is correctly configured.

In an embodiment, one or more data stores contains information associated with a manufacture of a device, a model number of a device, and/or one or more requests or commands that should be sent to a device. Thus, one or more data stores may be queried to determine at least a portion of the requests or commands that should be sent to a device. In one embodiment, one or more data stores contains information associated with one or more expected responses. Thus, one or more data stores may be queried to determine whether a response indicates that BGP is configured correctly.

In block 960 a potential solution is determined. Determining a potential solution may be performed by any number of devices or in any number of ways. Determining a potential solution may be performed by a server related to the connection. The server may access a data store containing information about the connection, similar connection problems, historical information, or potential solutions. For example, in FIG. 4, server 405 may determine a potential solution and may query data store 445 in doing so. In another embodiment, gateway 420 may determine a potential solution and may query data store 445 for information when making the determination.

A potential solution can include any number of possible solutions to one or more potential connection problems. In one embodiment, a potential solution may be a single solution to a single potential connection problem. A potential solution may provide numerous possible solutions to a potential connection problem. In an embodiment, a potential solution includes numerous possible solutions to numerous potential problems related to one or more connections or portions of one or more connections. In one embodiment, a potential solution may rank possible solutions in an order of likely solutions. For example, if four possible solutions to a potential connection problem are determined, then a potential solution may list the most probable solution first and the least probable solution last.

A potential solution can include information or instructions related to restoring connectivity for a potential connection problem. For example, if no IKE security association exists, then one potential solution may be to verify the IKE configuration settings to make sure that the encryption, authentication, and mode parameters are correctly configured. If an IPsec security association does not exist, then one potential solution may be to verify that the IPsec security association configuration is properly configured. If there is no IP connectivity via a tunnel in a connection, then a potential solution may be to verify that the tunnel interface configuration is properly configured. If a BGP status associated with a connection is not active, then the BGP configuration may need to be verified. Additional problems and potential solutions are within the scope of this disclosure.

Referring back to FIG. 9, after a potential solution is determined 960 the method 900 proceeds to block 970. In block 970, the potential solution is sent. A potential solution may be sent by any number of devices. A potential solution may be sent by a server or by a gateway. For example, referring to FIG. 4, a potential solution may be sent by gateway 420. In one embodiment, a potential solution may be sent by server 405. A potential solution may be sent to any number of devices. For example, in one embodiment, a potential solution may be emailed to one or more email addresses. In another embodiment, a potential solution may be sent via text message to one or more numbers. A potential solution can be sent to one or more telephone numbers via an automated voice notification. In one embodiment, a potential solution is sent via an application programming interface.

A potential solution can provide numerous types of information. For example, a potential solution may contain information related to a connectivity event or a potential connectivity problem. A potential solution can include information such as a time that a connectivity event occurred or was detected. A potential solution may include information including, but not limited to, interne protocol (IP) addresses, media access control (MAC) addresses, whether a connection was successful, the number of tunnels in a connection, the number of tunnels that are active, the number of tunnels that are inactive, a type of encryption, a strength of encryption, connection length, connection speed, bandwidth available, bandwidth used, number of connections, type of connections, traffic direction, port numbers, host names, dates, times, packets received, response time, route information, or a combination thereof. A potential solution can include information stored in a data store. In one embodiment, a potential solution includes information regarding a user or an account associated with the connectivity event. One or more data stores may be accessed for determining information to include in a potential solution. One or more data stores may have information stored needed potential solution.

Figure 10:
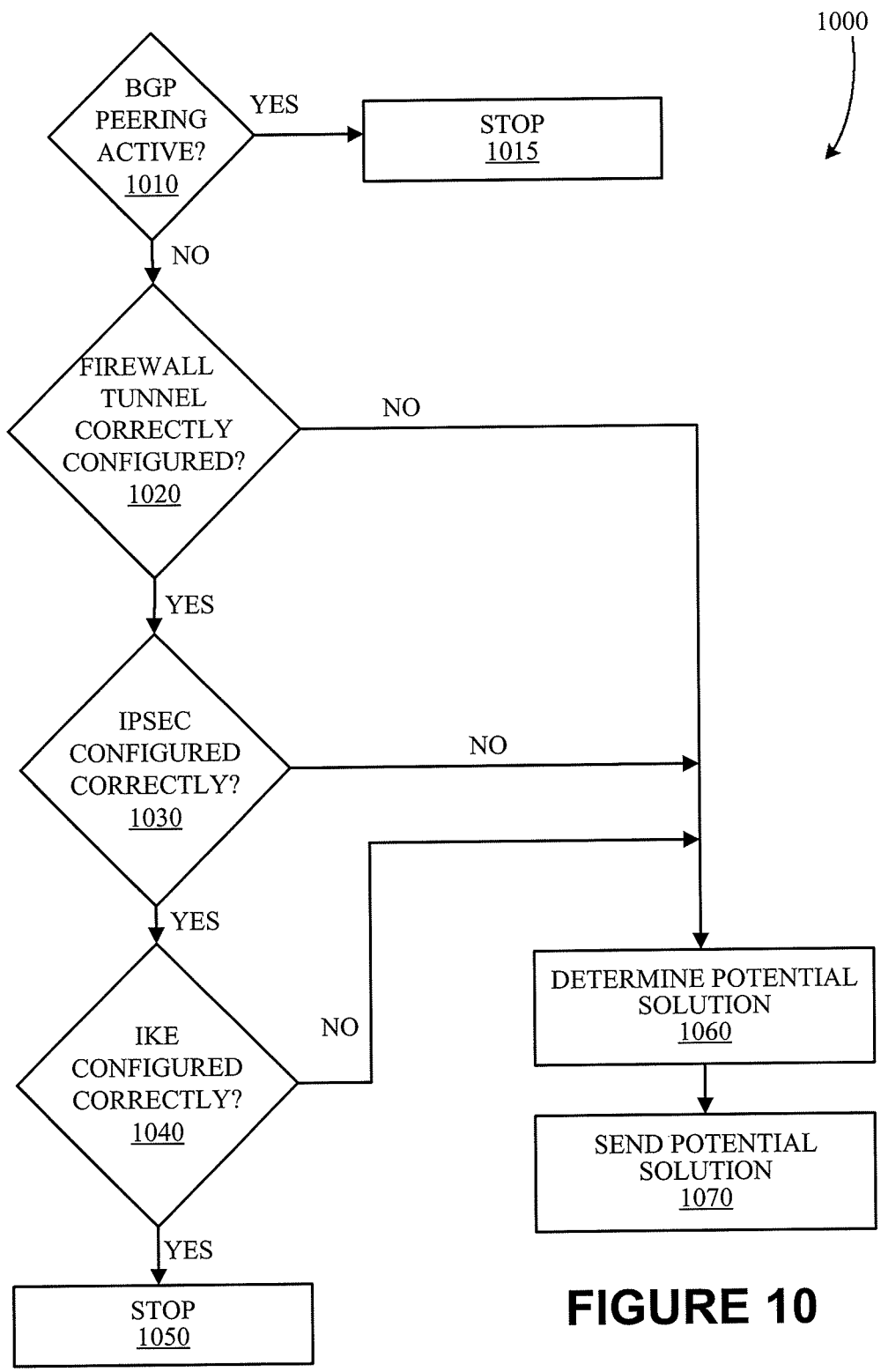
FIG. 10 is a flowchart illustrating a method of detecting a potential connectivity problem and sending a potential solution according to an embodiment.

While the steps of methods disclosed herein have been shown and described in a particular order, other embodiments may comprise the same or additional steps or may perform the steps in a different order or in parallel. For example, FIG. 10 illustrates a method of detecting a potential connectivity problem and sending a potential solution according to an embodiment. In the embodiment shown in FIG. 10, the method 1000 begins with a determination as to whether BGP peering is active 1010. If it is determined that BGP peering is not active, then a determination is made as to whether a firewall and a tunnel are correctly configured 1020. If it is determined that the firewall and the tunnel are correctly configured, then a determination is made as to whether IPsec is configured correctly 1030. If it is determined that IPsec is configured correctly, a determination is made as to whether IKE is configured correctly 1040. In the embodiment, shown in FIG. 10, if at any point it is determined that the firewall, tunnel, IPsec, or IKE is not configured correctly, then a potential solution is determined 1060 and the potential solution is sent 1070 to a user associated with at least a portion of the connection. Other variations are within the scope of this disclosure.

Figure 11:
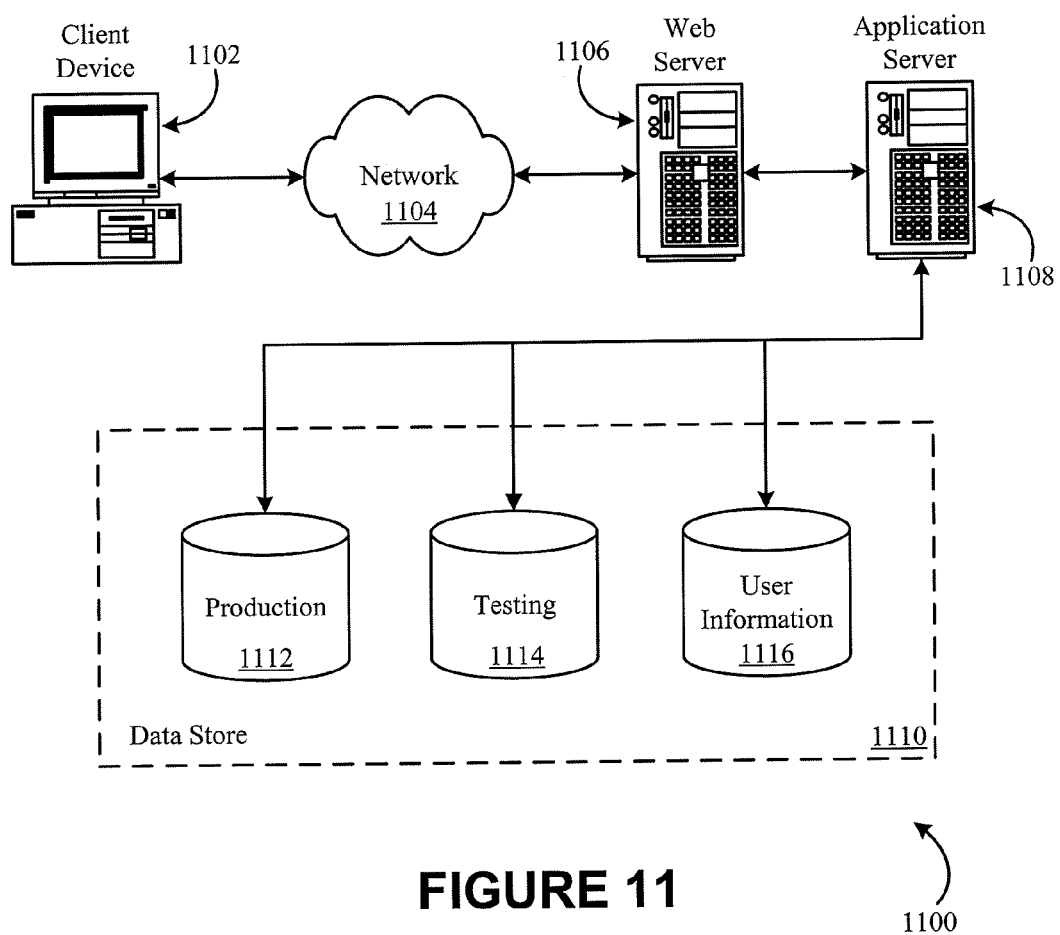
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in an embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for monitoring a virtual private network (VPN) connection, comprising:
   under the control of one or more computer systems configured with executable instructions,
   obtaining, by the one or more computer systems, data that collectively indicate a status of a VPN connection;
   analyzing, by the one or more computer systems, the obtained data to determine whether a VPN connectivity event related to the status of the VPN connection has occurred; and
   in response to a determination that the VPN connectivity event has occurred:
      determining, by the one or more computer systems, whether at least a portion of the VPN connection is incorrectly configured;
      determining, by the one or more computer systems, a potential problem for at least the portion of the VPN connection based at least in part on whether the portion of the VPN connection is incorrectly configured;
      determining, by the one or more computer systems, a potential solution to the potential problem; and
      sending, by the one or more computer systems, electronic information that encodes a notification to a user associated with an account for the VPN connection, wherein the notification indicates that the VPN connectivity event has occurred and the potential solution.

2. The computer-implemented method of claim 1 further comprising: receiving, by the one or more computer systems, a request from the user associated with the account to subscribe to notifications of VPN connectivity events.

3. The computer-implemented method of claim 1, wherein:
   the portion of the VPN connection comprises an internet protocol security (IPsec) association; and
   determining a potential problem for at least the portion of the VPN connection based at least in part on whether the portion of the VPN connection is incorrectly configured comprises:
      determining that the potential problem is related to a border gateway protocol (BGP) configuration or a firewall configuration associated with the VPN connection when it is determined that the IPsec association is correctly configured.

4. The computer-implemented method of claim 1, wherein:
   the portion of the VPN connection comprises an internet protocol security (IPsec) association; and
   determining a potential problem for at least the portion of the VPN connection based at least in part on whether the portion of the VPN connection is incorrectly configured comprises:
      determining that the potential problem is related to an IPsec association configuration or an internet key exchange (IKE) configuration associated with the VPN connection when it is determined that the IPsec association is incorrectly configured.

5. The computer-implemented method of claim 1, wherein:
   the VPN connectivity event comprises at least a portion of the VPN connection being disconnected; and
   determining whether the VPN connectivity event has occurred comprises determining whether the portion of the VPN connection is disconnected.

6. The computer-implemented method of claim 5, wherein:
   the VPN connection comprises a first tunnel and a second tunnel;
   the portion of the VPN connection being disconnected comprises the first tunnel and the second tunnel being simultaneously disconnected; and
   determining whether the VPN connectivity event has occurred comprises determining whether the first tunnel and the second tunnel are simultaneously disconnected.

7. The computer-implemented method of claim 5, wherein:
   the VPN connection comprises a first tunnel connection;
   the portion of the VPN connection being disconnected comprises the first tunnel connection being disconnected;

determining whether the portion of the VPN connection is disconnected comprises determining whether the first tunnel connection is disconnected;

determining whether at least a portion of the VPN connection is incorrectly configured comprises obtaining data that collectively indicate whether an internet key exchange (IKE) association for the first tunnel connection is incorrectly configured; and determining a potential problem for at least the portion of the VPN connection comprises determining the problem based at least in part on whether the IKE association for the first tunnel connection is incorrectly configured.

8. The computer-implemented method of claim 1, wherein obtaining data that collectively indicate a status of a VPN connection comprises analyzing a data log from at least one gateway participating in the VPN connection.

9. The computer-implemented method of claim 1, wherein:

obtaining data that collectively indicate a status of a VPN connection comprises collecting data for a plurality of VPN connections; and analyzing the obtained data to determine whether a VPN connectivity event related to the status of the VPN connection has occurred comprises analyzing information associated with the plurality of VPN connections to determine whether a connectivity event common to at least a portion of the plurality of VPN connections has occurred.

10. A computer-implemented method for monitoring a connection between a first network and a second network that is remote from the first network, comprising:

under the control of one or more computer systems of the second network, the one or more computer systems being configured with executable instructions, collecting, by the one or more computer systems, connectivity data related to the connection between the first network and the second network;

analyzing, by the one or more computer systems, the collected connectivity data;

determining, by the one or more computer systems, whether a connectivity event has occurred based at least in part on the analyzed data; and in response to a determination that the connectivity event has occurred:

determining, by the one or more computer systems, a potential solution to a potential problem related to the connection and the connectivity event; and sending, by the one or more computer systems, the potential solution to a user associated with the first network.

11. The computer-implemented method of claim 10, wherein the notification comprises an email message, a SMS text message, or an automated telephone call.

12. The computer-implemented method of claim 10, wherein the notification is sent in response to an application programming interface (API) call.

13. The computer-implemented method of claim 10, further comprising:

storing, by the one or more computer systems, the collected connectivity data in at least one data store; and wherein determining whether a connectivity event has occurred is based at least in part on information stored in the at least one data store.

14. The computer-implemented method of claim 10, wherein collecting connectivity data related to the connection comprises:

requesting information from at least one router related to the connection;

receiving the requested information from the at least one router; and determining a status for the connection based at least in part on the received information.

15. The computer-implemented method of claim 10, wherein collecting connectivity data related to the connection comprises obtaining information from at least one gateway related to the connection.

16. The computer-implemented method of claim 10, wherein collecting connectivity data related to the connection comprises obtaining information related to a plurality of connections including the connection.

17. One or more computer-readable storage media having collectively stored thereon instructions that, when executed by a computer system, cause the computer system to at least:

collect information that associates an electronic address related to a remote network with a status of a connection;

determine one or more connectivity events for the connection;

dynamically determine whether at least one of the connectivity events has occurred; and in response to a determination that the connectivity event has occurred:

determine a potential solution to a potential problem related to the connection and the connectivity event; and send the potential solution to a user associated with the remote network.

18. The one or more computer-readable storage media of claim 17, wherein the notification is sent in response to an application programming interface (API) call from a device associated with an account related to the connection.

19. The one or more computer-readable storage media of claim 17, wherein at least one of the connectivity events comprises a change in the status of the connection.

20. The one or more computer-readable storage media of claim 19, wherein the change in the status comprises at least a portion of the connection failing.

21. The one or more computer-readable storage media of claim 20, wherein at least a portion of the connection failing comprises at least one tunnel of the connection becoming disconnected.

22. The one or more computer-readable storage media of claim 17, wherein a second connection facilitates sending the notification to the electronic address.

23. The one or more computer-readable storage media of claim 22, wherein the second connection comprises an Internet connection.

24. A computer system for determining a potential problem related to a network connection, comprising:

one or more processors; and memory, including executable instructions that, when executed by the one or more processors, cause the computer system to at least:

check a configuration of at least one association from a plurality of associations for the network connection;

determine a potential problem for the network connection based at least in part on the checked configuration when it is determined that the configuration indicates that the network connection is at least partially disconnected;

determine a potential solution to the potential problem based at least in part on the configuration; and send the potential solution through a second network connection to a user related to the network connection.

25. The computer system of claim 24, wherein:
the network connection comprises a virtual private network (VPN) connection having at least a first tunnel connection; and
the at least one association comprises an internet key exchange (IKE) for the first tunnel connection or an internet protocol security (IPsec) association for the first tunnel connection.

26. The computer system of claim 24, wherein:
the network connection comprises a virtual private network (VPN) connection having at least a first tunnel connection; and
check a configuration of at least one association from a plurality of associations for the network connection comprises:
check the first tunnel connection for connectivity;
check an internet protocol security (IPsec) association for the first tunnel connection when it is determined that the first tunnel connection is not connected.

27. The computer system of claim 26, wherein:
check a configuration of at least one association from a plurality of associations for the network connection further comprises:
check an internet key exchange (IKE) for the first tunnel connection when it is determined that the IPsec association for the first tunnel connection is incorrectly configured.

28. The computer system of claim 24, wherein the potential problem comprises a timeout error and the potential solution comprises configuring a firewall related to the network connection to allow incoming traffic.

29. The computer system of claim 24, wherein the potential problem comprises an encryption error and the potential solution comprises using a valid key for the network connection.

30. The computer system of claim 24, wherein:
determining the potential problem comprises parsing data from at least one device related to the network connection; and
determining the potential solution comprises querying a data store for the potential solution based at least in part on the potential problem.

* * * * *